(12) United States Patent
Asami

(10) Patent No.: US 8,514,175 B2
(45) Date of Patent: Aug. 20, 2013

(54) INPUT DEVICE, INPUT CONTROL METHOD, INFORMATION RECORDING MEDIUM, AND PROGRAM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 706 days.

(21) Appl. No.: 12/528,953

(22) PCT Filed: Dec. 26, 2007

(86) PCT No.: PCT/JP2007/074966
§ 371 (c)(1),
(2), (4) Date: Aug. 27, 2009

(87) PCT Pub. No.: WO2008/108049
PCT Pub. Date: Sep. 12, 2008

(65) Prior Publication Data
US 2010/0103094 A1    Apr. 29, 2010

(30) Foreign Application Priority Data

Mar. 2, 2007    (JP) .................................. 2007-052855

(51) Int. Cl.
*G09G 5/08*    (2006.01)
(52) U.S. Cl.
USPC ............................................. 345/158; 463/37
(58) Field of Classification Search
USPC .................................................. 345/156–173
See application file for complete search history.

(56) References Cited

U.S. PATENT DOCUMENTS

| | | | |
|---|---|---|---|
| 6,641,482 B2 | 11/2003 | Masuyama et al. | |
| 2002/0026866 A1 | 3/2002 | Nishitani et al. | |
| 2002/0072418 A1 | 6/2002 | Masuyama et al. | |
| 2006/0060068 A1* | 3/2006 | Hwang et al. | 84/615 |

(Continued)

FOREIGN PATENT DOCUMENTS

| | | |
|---|---|---|
| CN | 1626030 A | 6/2005 |
| CN | 1758795 A | 4/2006 |

(Continued)

OTHER PUBLICATIONS

Chinese First Office Action issued Oct. 13, 2010 with English Translation.

(Continued)

*Primary Examiner* — Kevin M Nguyen
*Assistant Examiner* — Kenneth B Lee, Jr.
(74) *Attorney, Agent, or Firm* — Howard & Howard Attorneys PLLC

(57) ABSTRACT

In an input device (300), a grip module (201) gripped by a user detects its posture and a button pressing operation of the user. A storage unit (301) stores a track of the detected posture, amounting to a predetermined period. A calculating unit (302) calculates an amount of change of the posture over the predetermined period. When a pressing operation is detected, an estimating unit (303) estimates the pressing operation intensity according to the calculated amount of change. A determining unit (304) determines whether or not a shaking operation has been given to the grip module (201), from the calculated amount of change. An output unit (305) outputs the result of estimation by the estimating unit (303) of the pressing operation intensity. When the determining unit (304) determines a shaking operation, the output unit (305) further outputs the shaking operation intensity according to the calculated amount of change.

12 Claims, 12 Drawing Sheets

(56) References Cited

U.S. PATENT DOCUMENTS

2007/0012167 A1  1/2007  Bang et al.
2007/0270222 A1* 11/2007  Yamanaka et al. .............. 463/37
2008/0024435 A1*  1/2008  Dohta ........................... 345/156

FOREIGN PATENT DOCUMENTS

| EP | 1631049 A1 | 3/2006 |
|---|---|---|
| JP | 10-214155 A | 8/1998 |
| JP | 2000-107444 A | 4/2000 |
| JP | 2004-033293 A | 2/2004 |
| JP | 2004-033371 A | 2/2004 |
| JP | 2005-190465 A | 7/2005 |
| JP | 2006-031307 A | 2/2006 |
| JP | 2008-027385 | 2/2008 |

OTHER PUBLICATIONS

Office Action issued on Mar. 25, 2008 for Japanese Patent Application No. 2007-052855, and English Translation, 4 pages.
Supplementary European Search Report for Patent Application No. EP 07860195, mailed on Apr. 7, 2010, 7 pages.
International Search Report for PCT/JP2007/074966 dated Feb. 5, 2008.

* cited by examiner

FIG.6A 370

| AMOUNT OF CHANGE OF POSTURE | PRESSING OPERATION INFORMATION |
|---|---|
| SMALLER THAN C1 | WEAKLY PRESSED |
| NOT SMALLER THAN C1 AND SMALLER THAN C2 | RATHER WEAKLY PRESSED |
| NOT SMALLER THAN C2 AND SMALLER THAN C3 | RATHER STRONGLY PRESSED |
| EQUAL TO OR GREATER THAN C3 | STRONGLY PRESSED |

FIG.6B 380

| AMOUNT OF CHANGE OF POSTURE | SHAKING OPERATION INFORMATION |
|---|---|
| SMALLER THAN Cth | NOT SHAKEN |
| EQUAL TO OR GREATER THAN Cth | SHAKEN |

FIG.6C 380

| AMOUNT OF CHANGE OF POSTURE | SHAKING OPERATION INFORMATION |
|---|---|
| SMALLER THAN Cth | NOT SHAKEN |
| NOT SMALLER THAN Cth AND SMALLER THAN C4 | WEAKLY SHAKEN |
| EQUAL TO OR GREATER THAN C4 | STRONGLY SHAKEN |

FIG.6D

| AMOUNT OF CHANGE OF POSTURE | OUTPUT RESULT | |
|---|---|---|
| SMALLER THAN C2 | WEAKLY PRESSED | } 370 |
| NOT SMALLER THAN C2 AND SMALLER THAN Cth | STRONGLY PRESSED | |
| EQUAL TO OR GREATER THAN Cth | SHAKEN | } 380 |

FIG.6E

| AMOUNT OF CHANGE OF POSTURE | OUTPUT RESULT | |
|---|---|---|
| SMALLER THAN C2 | WEAKLY PRESSED | } 370 |
| NOT SMALLER THAN C2 AND SMALLER THAN Cth | STRONGLY PRESSED | |
| NOT SMALLER THAN Cth AND SMALLER THAN C4 | WEAKLY SHAKEN | |
| EQUAL TO OR GREATER THAN C4 | STRONGLY SHAKEN | } 380 |

INPUT DEVICE, INPUT CONTROL METHOD, INFORMATION RECORDING MEDIUM, AND PROGRAM

TECHNICAL FIELD

The present invention relates to an input device, an input control method, an information recording medium, and a program that are suitable for estimating the intensity of a pressing operation of a user.

BACKGROUND ART

In a video game using a computer, a user generally plays the game by issuing instructions to the character object (hereinafter simply referred to as "character") operated by the user, by using an input device, so-called controller, that has a plurality of operation keys. When the user presses an operation button on the controller, the game apparatus receives an instruction input signal corresponding to the pressed operation button, and progresses the game by moving the character up or down or left or right or firing a virtual gun, etc. based on the instruction input signal.

Recently, multifunctional controllers that can measure positions and accelerations have become popular. Patent Literature 1 discloses a controller that has a pressure sensor that detects a pressure of pressing an operation button. According to this technique, a game apparatus can detect that an operation button of the controller is pressed, and can also obtain the intensity of the user's pressing the operation button via the pressure sensor.

Patent Literature 1: Unexamined Japanese Patent Application KOKAI Publication No. 2004-33371

DISCLOSURE OF INVENTION

Problem to be Solved by the Invention

For example, in a game in which a player plays a percussion instrument, by obtaining the intensity of the player's pressing an operation button, it is possible to change the loudness of a sound or to change a rendering according to the obtained intensity. However, the design of the controller becomes complex if the controller is equipped with a pressure sensor, and the production cost of the controller rises. And the users have to purchase a new controller when they already have ones, which is a large expense.

The present invention was made to solve such problems, and an object of the present invention is to provide an input device, an input control method, an information recording medium, and a program that are suitable for estimating the intensity of a user's pressing operation.

Means for Solving the Problem

To achieve the above object, the following invention will be disclosed according to the principle of the present invention.

An input device according to a first aspect of the present invention includes a detecting device, a storage unit, a calculating unit, an estimating unit, and an output unit.

The detecting device is gripped by a user and detects the posture of the detecting device and a pressing operation of the user.

The storage unit stores a track of the posture, which amounts to a predetermined period of time, detected by the detecting device.

The calculating unit calculates the amount of change of the posture over the predetermined period of time, from the track of the posture stored in the storage unit.

The estimating unit estimates the intensity of the pressing operation of the user from the calculated amount of change.

The output unit outputs pressing operation information that specifies the intensity of the pressing operation of the user estimated by the estimating unit.

Hence, the input device can easily estimate the intensity of a pressing operation of the user. At this time, the input device does not need to include a component for directly measuring the intensity of the pressing operation, such as a pressure sensor. For example, the detecting device is a grip module (so-called "controller") that is operated by a user by gripping it in a hand to issue an instruction to the input device.

The input device may further include a determining unit that determines that the user has given a shaking operation, in a case where the calculated amount of change is equal to or greater than a predetermined threshold.

The output unit may further output shaking operation information that specifies the calculated amount of change as the intensity of the shaking operation.

Hence, the input device can easily estimate the intensity of a pressing operation of the user and also can easily determine the intensity of a shaking operation of the user.

The estimating unit may estimate the intensity of the pressing operation of the user to be larger as the calculated amount of change is larger.

As a result, the input device estimates a larger pressing intensity as the amount of change of the posture is larger.

The estimating unit may estimate the intensity of the pressing operation of the user to be a predetermined maximum intensity, in a case where the calculated amount of charge is equal to or greater than the predetermined threshold.

As a result, the input device estimates the intensity of the pressing operation to have reached its upper limit value in a case where the amount of change of the posture is equal to or greater than the predetermined threshold.

The estimating unit may estimate the intensity of the pressing operation of the user, from an amount of change that is calculated by the calculating unit after a predetermined waiting period passes after the detecting device detects the pressing operation of the user.

Hence, the input device can estimate the intensity of a pressing operation based on changes of the posture before and after a pressing operation is given by the user. That is, since the input device estimates the intensity of a pressing operation based on both a change of the posture caused by the user's preliminary movement before pressing and a change of the posture after pressing, the input device can estimate the intensity more truly to the user's action.

The detecting device may further detect the position of the detecting device.

The storage unit may further store a track of the position, which amounts to a predetermined period of time, detected by the detecting device, in association with the track of the posture detected by the detecting device.

The calculating unit may further calculate the amount of change of the position over the predetermined period of time, from the track of the position stored in the storage unit.

The estimating unit may estimate the intensity of the pressing operation of the user, from the calculated amount of change of the posture and the calculated amount of change of the position.

Hence, the input device can estimate the intensity of a pressing operation according to not only an amount of change of the posture but an amount of change of the position, and therefore can estimate the demarcation between a pressing operation and a shaking operation of the user.

An input control method according to another aspect of the present invention is an input control method performed by an input device that includes a storage unit and a detecting device, and includes a detecting step, a calculating step, an estimating step, and an outputting step.

The storage unit stores a track of a posture, which amounts to a predetermined period of time, detected by the detecting device.

At the detecting step, the posture of the detecting device that is gripped by a user, and a pressing operation of the user are detected.

At the calculating step, the amount of change of the posture over the predetermined period of time is calculated from the track of the posture stored in the storage unit.

At the estimating step, the intensity of the pressing operation of the user is estimated from the calculated amount of change, when a pressing operation of the user is detected at the detecting step.

At the outputting step, pressing operation information that specifies the intensity of the pressing operation of the user estimated at the estimating step is output.

Hence, an input device that employs this input control method can easily estimate the intensity of a pressing operation of a user. At this time, the input device needs not directly measure the intensity of the pressing operation by using a pressure sensor or the like.

An information recording medium according to another aspect of the present invention stores a program that controls a computer, including a detecting device which is gripped by a user and detects the posture of the detecting device and a pressing operation of the user, to function as a storage unit, a calculating unit, an estimating unit, and an output unit.

The storage unit stores a track of the posture, which amounts to a predetermined period of time, detected by the detecting device.

The calculating unit calculates the amount of change of the posture over the predetermined period of time, from the track of the posture stored in the storage unit.

The estimating unit estimates the intensity of the pressing operation of the user, from the calculated amount of change when the detecting device detects a pressing operation of the user.

The output unit outputs pressing operation information that specifies the intensity of the pressing operation of the user estimated by the estimating unit.

Hence, a computer that performs the program stored in this information recording medium functions as an input device that can easily estimate the intensity of a pressing operation of a user. At this time, the computer needs not include a component such as a pressure sensor that directly measures the intensity of a pressing operation.

A program according to another aspect of the present invention controls a computer, including a detecting device which is gripped by a user and detects the posture of the detecting device and a pressing operation of the user, to function as a storage unit, a calculating unit, an estimating unit, and an output unit.

The storage unit stores a track of the posture, which amounts to a predetermined period of time, detected by the detecting device.

The calculating unit calculates the amount of change of the posture over the predetermined period of time, from the track of the posture stored in the storage unit.

The estimating unit estimates the intensity of the pressing operation of the user, from the calculated amount of change, when the detecting device detects a pressing operation of the user.

The output unit outputs pressing operation information that specifies the intensity of the pressing operation of the user estimated by the estimating unit.

Hence, a computer that executes this program functions as an input device that can easily estimate the intensity of a pressing operation of the user. At this time, the computer needs not include a component such as a pressure sensor that directly measures the intensity of a pressing operation.

The program according to the present invention may be recorded on a computer-readable information recording medium such as a compact disk, a flexible disk, a hard disk, a magneto-optical disk, a digital video disk, a magnetic tape, a semiconductor memory, etc.

The program described above may be distributed or sold via a computer communication network independently from a computer on which the program is to be executed. The information recording medium described above may be distributed or sold independently from a computer.

Effect of the Invention

According to the present invention, it is possible to provide an input device, an input control method, an information recording medium, and a program that are suitable for estimating the intensity of a pressing operation of a user.

BRIEF DESCRIPTION OF DRAWINGS

FIG. 6A is a diagram showing an example configuration of pressing operation information.

FIG. 6B is a diagram showing an example configuration of shaking operation information.

FIG. 6C is a diagram showing another example configuration of shaking operation information.

FIG. 6D is a diagram showing an example configuration of an output result in which pressing operation information and shaking operation information are combined.

FIG. 6E is a diagram showing another example configuration of an output result in which pressing operation information and shaking operation information are combined.

Figure 1:
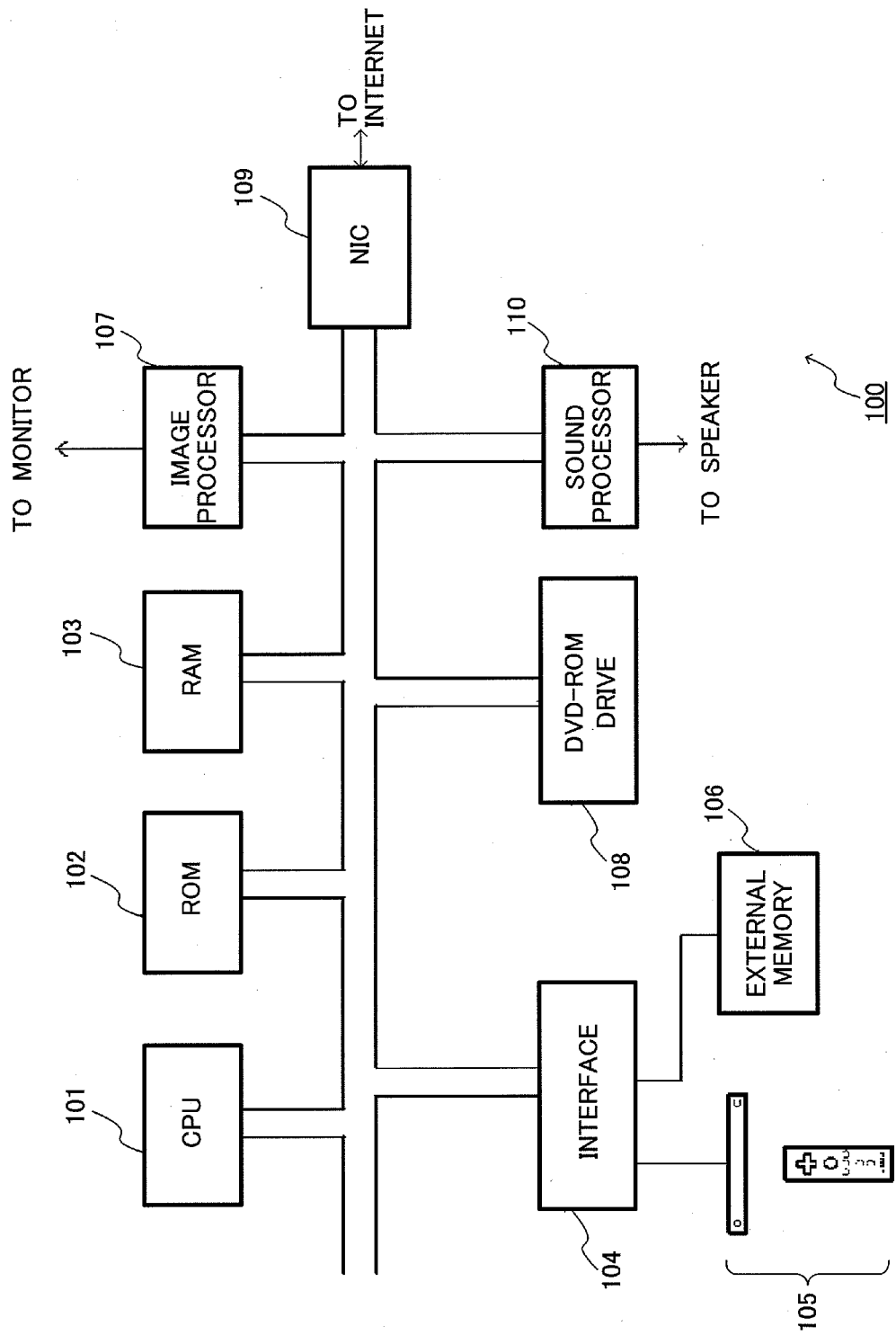
FIG. 1 is a diagram showing a schematic configuration of a typical information processing device by which a game apparatus according to the present invention is realized.

EXPLANATION OF REFERENCE NUMERALS 100 information processing device
101 CPU
102 ROM
103 RAM
104 interface
105 controller
106 external memory
107 image processor
108 DVD-ROM drive
109 NIC
110 sound processor
201 grip module
202 CCD camera
203 cross-shaped key
204 "A" button
205 "B" button
206 various buttons
207 indicator
208 power button
251 light emitting module
252 light emitting diode
291 television device
300 input device
301 storage unit
302 calculating unit
303 estimating unit
304 determining unit
305 output unit
350 posture data
360 position data
370 pressing operation information
380 shaking operation information

BEST MODE FOR CARRYING OUT THE INVENTION

Embodiments of the present invention will now be explained below. For easier understanding, embodiments in which the present invention is applied to a game apparatus will be explained below, but the present invention can likewise be applied to such information processing devices as computers of various kinds PDAs, cellular phones, etc. That is, the embodiments explained below are intended for illustration, not to limit the scope of the present invention. Hence, although those skilled in the art could employ embodiments obtained by replacing individual components or all the components of the embodiments below with equivalents of those, such embodiments will also be included in the scope of the present invention.

Example 1

FIG. 1 is an exemplary diagram showing a schematic configuration of a typical information processing device that performs the functions of a device according to an embodiment of the present invention. The following explanation will be given with reference to FIG. 1.

An information processing device 100 includes a CPU (Central Processing Unit) 101, a ROM 102, a RAM (Random Access Memory) 103, an interface 104, a controller 105, an external memory 106, an image processor 107, a DVD-ROM (Digital Versatile Disc ROM) drive 108, a NIC (Network Interface Card) 109, and a sound processor 110.

When a DVD-ROM that stores a game program and data is inserted to the DVD-ROM drive 108 and the information processing device 100 is turned on, the program is executed and an input device according to the present embodiment is realized.

The CPU 101 controls the entire operation of the information processing device 100, and is connected to each component to exchange control signals and data with it. The CPU 101 can perform arithmetic operations such as addition, subtraction, multiplication, division, etc., logical operations such as logical addition, logical multiplication, logical negation, etc., and bit operations such as bitwise OR, bitwise AND, bit inversion, bit shift, bit rotation, etc., by working an ALU (Arithmetic Logic Unit) (unillustrated) on a register (unillustrated), which is a memory area that can be accessed at a high speed. Furthermore, the CPU 101 may by itself be configured to be able to perform, at a high speed, saturate calculations such as addition, subtraction, multiplication, division, etc., trigonometric functions, vector operations, etc. to deal with multimedia processing, or may realize these operations with a coprocessor.

An IPL (Initial Program Loader), which is executed immediately after the power is turned on, is stored in the ROM 102, and when executed, makes a program stored on a DVD-ROM be read into the RAM 103 and executed by the CPU 101. Further, an operating system program and various data that are necessary for controlling the operation of the whole information processing device 100 are stored in the ROM 102.

The RAM 103 is a temporary memory for data and programs, and retains a program and data read out from a DVD-ROM and data necessary for game proceeding and chat communications. The CPU 101 secures a variable area in the RAM 103, and performs such processes as performing operations by directly working the ALU on the value stored as the variable, or once storing the value stored in the RAM 103 to a register to perform calculations toward the register and writing back the calculation result to the memory.

The controller 105 connected via the interface 104 receives an operation input given by a user for playing a game. The details of the controller 105 will be described later.

The external memory 106 detachably connected via the interface 104 rewritably stores data representing a play status of a game, etc. (past achievements, etc.), data representing a progress status of a game, log (record) data of chat communication for network game matches, etc. As needed, a user can record such data onto the external memory 106 by giving an instruction input via the controller 105.

A DVD-ROM to be mounted on the DVD-ROM drive 108 stores a program for realizing a game and image data and sound data that accompany the game. Under the control of the CPU 101, the DVD-ROM drive 108 performs a reading process to the DVD-ROM mounted thereon to read out a necessary program and data, which are to be temporarily stored on the RAM 103, etc.

The image processor 107 processes data read out from a DVD-ROM by means of the CPU 101 and an image calculation processor (unillustrated) possessed by the image processor 107, and records the processed data in a frame memory (unillustrated) possessed by the image processor 107. Image information recorded on the frame memory is converted to video signals at predetermined synchronization timings and output to a monitor (unillustrated) connected to the image processor 107. This enables various types of image display.

The image calculation processor can perform, at a high speed, overlay calculation of two-dimensional images, transparency calculation such as a blending, etc., and various saturation calculations.

In a case where a virtual space is configured three-dimensionally, the image calculation processor can perform rendering of polygon information arranged in the three-dimensional space and affixed with various texture information by Z buffering and obtain a rendered image of the polygon arranged in the virtual space as seen panoramically from a predetermined view position toward a predetermined direction of sightline.

Furthermore, the CPU 101 and the image calculation processor can in cooperation depict a string of letters as a two-dimensional image in the frame memory or on a surface of a polygon according to font information that defines the shape of the letters.

The NIC 109 connects the information processing device 100 to a computer communication network (unillustrated) such as the Internet, etc. The NIC 109 is constituted by a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet via a telephone line, a cable modem for connecting to the Internet via a cable television line, or the like, and an interface (unillustrated) that intermediates between any of these and the CPU 101.

The sound processor 110 converts sound data read out from a DVD-ROM into an analog sound signal and outputs it from a speaker (unillustrated) connected thereto. Further, under the control of the CPU 101, the sound processor 110 generates a sound effect or music data that should be released in the progress of a game, and outputs a sound corresponding to the data from the speaker.

In a case where sound data recorded on a DVD-ROM is MIDI data, the sound processor 110 refers to sound source data possessed by the MIDI data and converts the MIDI data into PCM data. In a case where sound data recorded on a DVD-ROM is sound data compressed in ADPCM form, Ogg Vorbis form, or the like, the sound processor 110 decompresses the data and converts it into PCM data. The PCM data is converted by D/A (Digital/Analog) converter at timings corresponding to the sampling frequency of the data and output to the speaker, thereby enabling sound output.

A microphone (unillustrated) may also be connected to the information processing device 100 via the interface 104. In this case, the information processing device 100 A/D converts an analog signal from the microphone at an appropriate sampling frequency into a digital signal in PCM form so that the sound processor 110 can process the signal by mixing, etc.

Furthermore, the information processing device 100 may use a large capacity external storage device such a hard disk or the like and configure it to serve the same function as the ROM 102, the RAM 103, the external memory 106, a DVD-ROM mounted on the DVD-ROM drive 108, or the like.

The information processing device 100 explained above is a so-called "video game apparatus for consumer use", but the present invention can be realized by any apparatus that performs image processing for enabling virtual space displaying. Hence, the present invention can be implemented on various computers such as cellular phones, portable game apparatuses, karaoke machines, ordinary business-use computers, etc.

For example, an ordinary computer includes, likewise the information processing device 100 described above, a CPU a RAM, a ROM, a DVD-ROM drive, and an NIC, an image processing unit with simpler capabilities than those of the information processing device 100, and a hard disk as its external storage device with also compatibility with a flexible disk, a magneto-optical disk, a magnetic tape, etc. Such a computer uses a keyboard, a mouse, etc. instead of the controller 105 as its input device.

In the present embodiment, the controller 105 that can measure various parameters such as positions, postures, etc. in a real world space is used.

Figure 2:
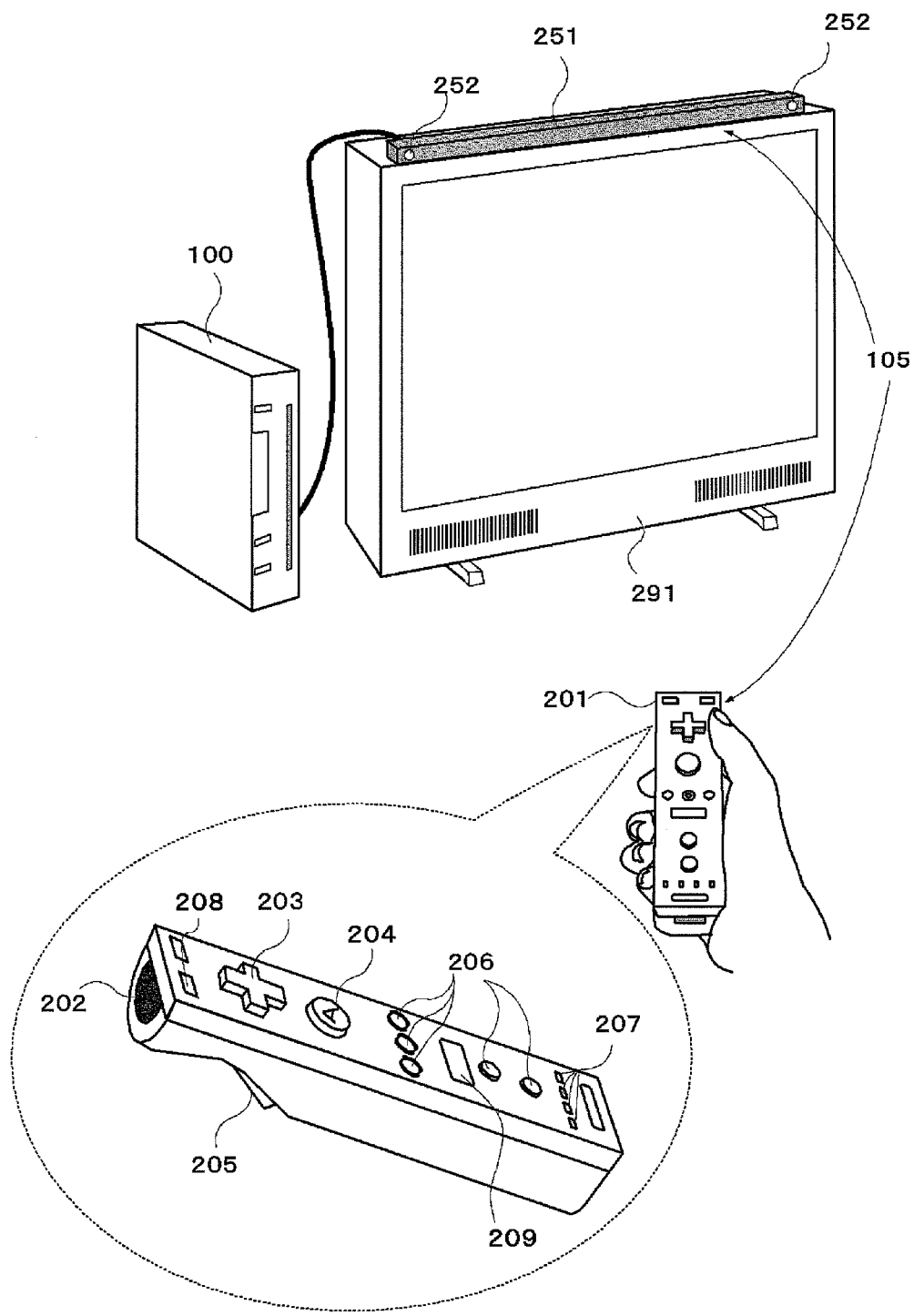
FIG. 2 is an explanatory diagram showing appearances of a controller and an information processing device used in the present embodiment.

FIG. 2 is an explanatory diagram showing the appearances of the controller 105, which can measure various parameters such as positions, postures, etc. in a real world space, and of the information processing device 100. The following explanation will be given with reference to FIG. 2.

The controller 105 is the combination of a grip module 201 and a light emitting module 251. The grip module 201 is connected to the information processing device 100 so as to be able to communicate with the information processing device 100 via wireless communication. The light emitting module 251 is connected to the information processing device 100 so as to be able to communicate with the information processing device 100 via a wire. Sounds or images representing the results of processing by the information processing unit 100 are output or displayed by a television device 291.

The grip module 201 has an appearance similar to a remote control of the television device 291, and has a CCD camera 202 on the tip.

The light emitting module 251 is fixed on the top of the television device 291. Light emitting diodes 252 are provided on both ends of the light emitting module 251, and emit light when supplied with power from the information processing device 100.

The CCD camera 202 of the grip module 201 captures images of behaviors of the light emitting module 251.

Information representing a captured image is sent to the information processing device 100, and the information processing device 100 acquires the position of the grip module 201 with respect to the light emitting module 251 based on the positions in the captured image at which the light emitting diodes 252 are captured.

Further, the grip module 201 includes an accelerometer, an angular accelerometer, an inclination sensor, etc. as built-in components, and can measure the posture of itself. The result of this measurement is also sent to the information processing device 100.

A cross-shaped key 203 is provided on the top face of the grip module 201, and a user can give direction instruction inputs by pressing the cross-shaped key 203. An "A" button 204, and various other buttons 206 are also provided on the top face of the grip module 201, and instruction inputs associated with the buttons can be given.

Meanwhile, a "B" button 205 is provided on the bottom face of the grip module 201, and mocks a hot button of a pistol or a manipulator, which seems realer with the recess of the bottom face of the grip module 201. Typically, instruction inputs for firing a gun or gripping something with a manipulator in a virtual space are issued by the B button 205.

An indicator 207 on the top face of the grip module 201 presents the user with an operation status of the grip module 201, a status of wireless communication with the information processing device 100, etc.

A power button 208 on the top face of the grip module 201 is provided for turning on/off the operation of the grip module 201 itself, and the grip module 201 operates on a battery (unillustrated) provided inside the grip module 201.

In addition, a speaker 209 is provided on the top face of the grip module 201, and outputs a sound represented by a sound signal supplied from the sound processor 110. The grip module 201 has a vibrator (unillustrated) inside and can control the presence/absence of vibration or the level of the vibration based on an instruction from the information processing device 100.

The following explanation is based on a premise that the position and posture of the grip module 201 in the real world are measured with the use of the controller 105 that is constituted by the combination of the grip module 201 and the light emitting module 251. However, measurement of the position and posture of the controller 105 in the real world not relying upon such a scheme but with the use of, for example, supersonic or infrared communication, GPS (Global Positioning System), or the like is also included in the scope of the present invention.

Next, a process performed by each unit of the input device 300 according to the present embodiment will be explained.

Figure 3:
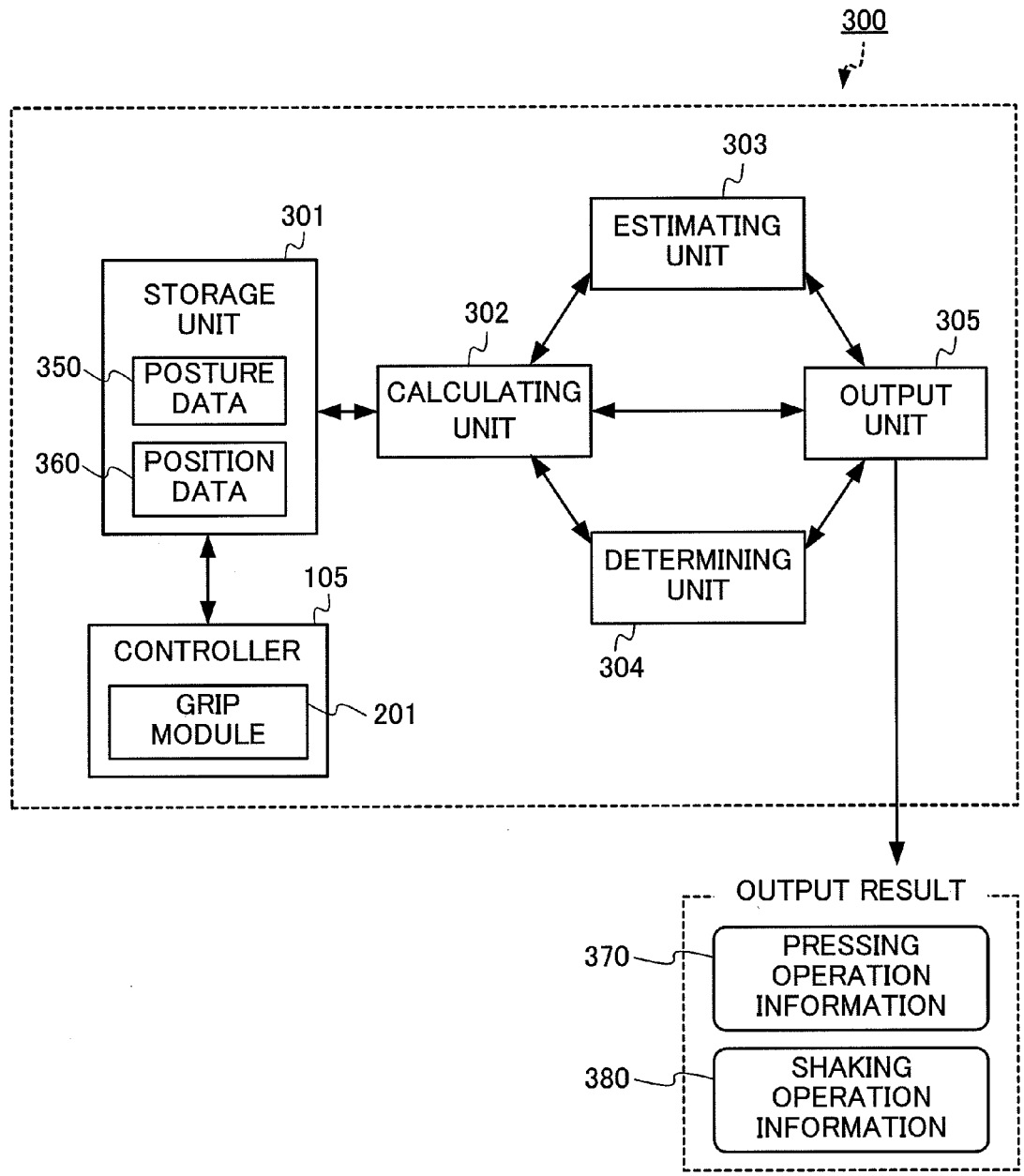
FIG. 3 is a configuration diagram for explaining a process performed by each unit of an input device.

FIG. 3 is a diagram for explaining a process performed by the input device 300 according to the present embodiment. As shown in FIG. 3, the input device 300 includes the controller 105, a storage unit 301, a calculating unit 302, an estimating unit 303, a determining unit 304, and an output unit 305.

The controller 105 is constituted by the grip module 201 and the light emitting module 251 as described above. The grip module 201 detects the posture of the grip module 201 and a user's pressing operation to each key provided on the grip module 201. That is, the grip module 201 is a detecting device that detects postures or pressing operations.

The storage unit 301 stores a track of the posture, which amount to a predetermined period of time, detected by the grip module 201. For example, the grip module 201 detects the posture of the grip module 201 at regular timings such as vertical synchronization interrupts, and inputs the measurement result data to the CPU 101. The storage unit 301 stores some pieces of the posture data 350, which amount to a predetermined number of measurements and show the results of the measurements, as a history record. The storage unit 301 can store N pieces (N is an integer equal to or greater than 1) of the posture data 350 of the most lately detected posture data 350. When the number of the detected posture data 350 exceeds N, the storage unit 301 deletes the oldest posture data 350 and stores the latest N pieces of posture data 350. The CPU 101 and the RAM 103 operate in cooperation to function as the storage unit 301. The external memory 106 may store the posture data 350.

The posture data 350 includes data representing the inclination of the grip module 201 measured by the inclination sensor provided in the grip module 201, data representing the acceleration at which the grip module 201 moves measured by the accelerometer likewise provided in the grip module 201, and data representing the velocity at which the grip module 201 moves, which is obtained by integrating the measured acceleration with respect to time. The posture data 350 may further include data representing the angular acceleration, the angular velocity, the direction of the rotation, or the like of the grip module 201.

The storage unit 301 may further store the position data 360 that indicates a position of the grip module 201 in a real world space as a history record. In this case, the storage unit 301 stores the latest N pieces of the position data 360 in association with the latest N pieces of the posture data 350. A position is represented with the use of predetermined spatial coordinates. Any arbitrary coordinate system may be selected. For example, an orthogonal coordinate system based on three axes orthogonal to one another may be used, or a polar coordinate system such as a spherical coordinate system using one moving radius and two declinations may be used.

The calculating unit 302 calculates the amount of change of the posture of the grip module 201 over a predetermined period of time, from the posture data 350 for the predetermined period of time stored in the storage unit 301. The CPU 101 and the controller 105 operate in cooperation to function as the calculating unit 302.

Figure 4A:
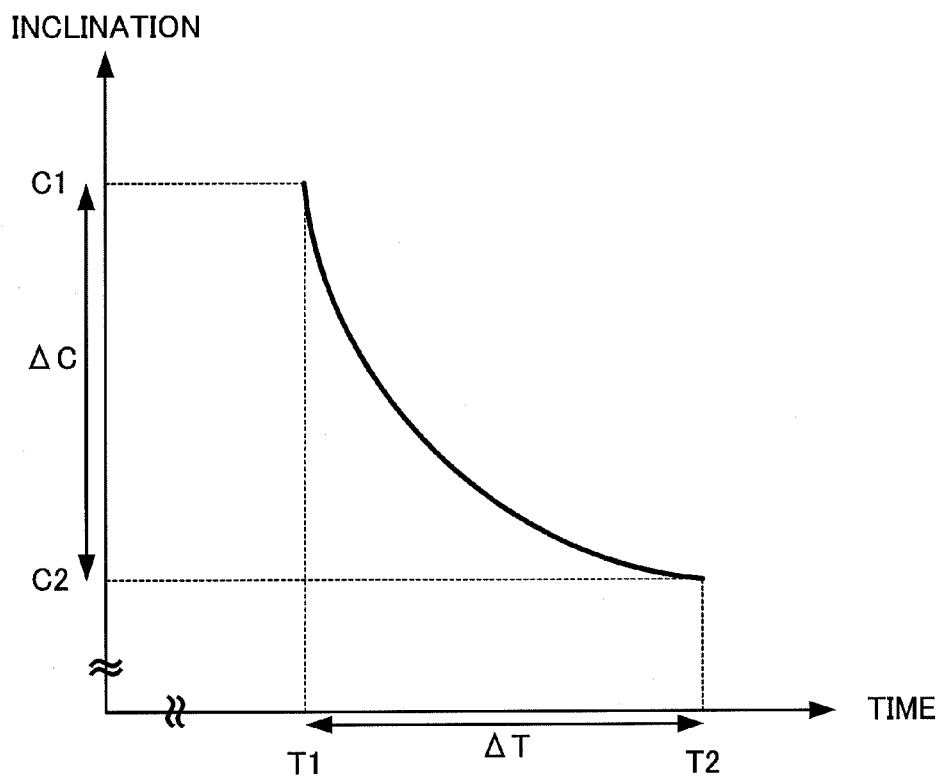
FIG. 4A is a diagram showing an example of temporal change of posture data indicating inclination.
Figures 4B, 4C:
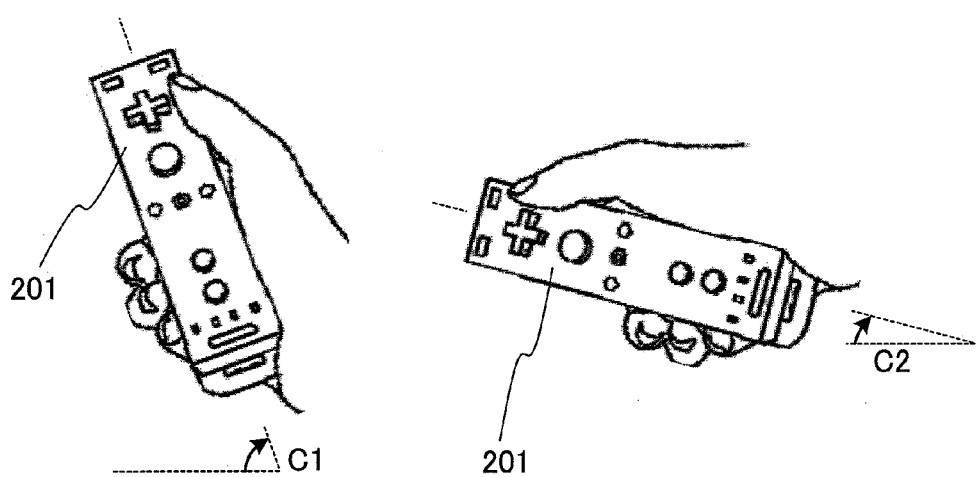
FIG. 4B is a diagram showing an example of the posture of a grip module.
FIG. 4C is a diagram showing another example of the posture of the grip module.

Specifically, for example, the calculating unit 302 can calculate the amount of change of the posture over a predetermined period of time (for example, one second) by using only the data representing the inclination in the posture data 350. FIG. 4A is an example graph of a temporal change of the posture data 350 representing the inclination of the grip module 201 obtained by the inclination sensor. In a case where the inclination of the grip module 201 at a timing T1 is C1 as shown in FIG. 4B and the inclination of the grip module 201 at a timing T2 is C2 as shown in FIG. 4C, the amount $\Delta C$ of change of the inclination over the elapse time $\Delta T$ ($=T2-T1$) is $C2-C1$. The absolute value of the amount of change may be used. In the same manner, the calculating unit 302 can calculate the amount $\Delta C$ of change of the inclination over an arbitrary period of time. In this example, inclinations with respect to a direction perpendicular to the direction of gravitational force (with respect to the horizontal direction) are used, but this is one example, and inclinations may be defined with respect to any arbitrary reference direction.

Figure 5A:
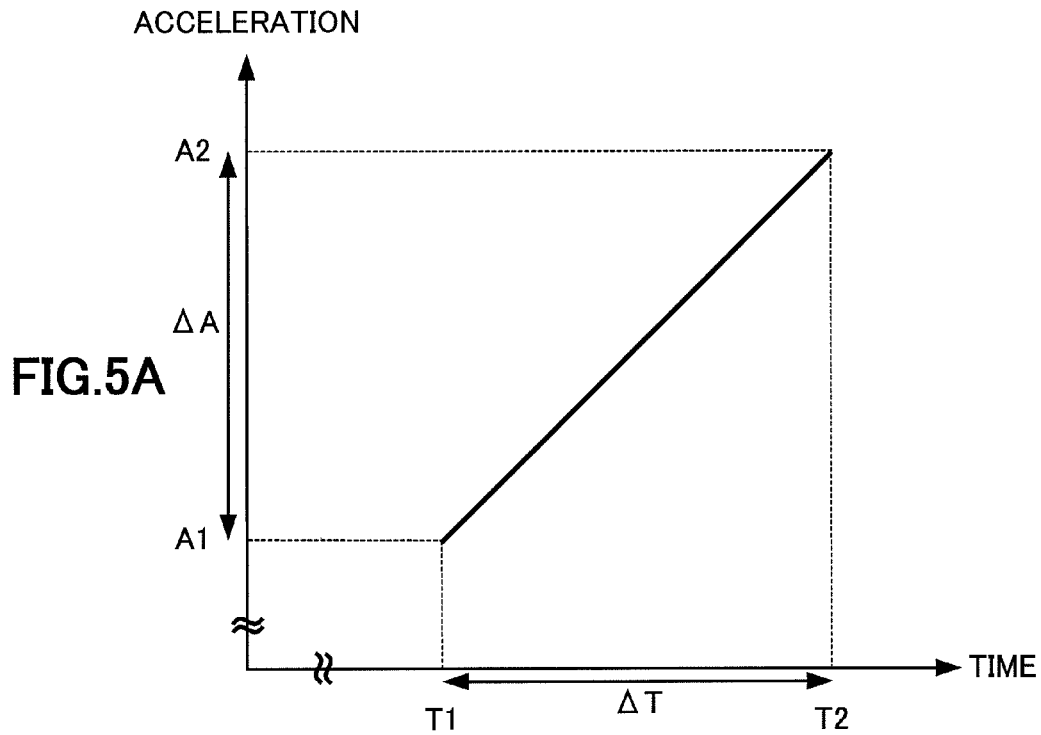
FIG. 5A is a diagram showing an example of temporal change of posture data indicating acceleration.
Figure 5B:
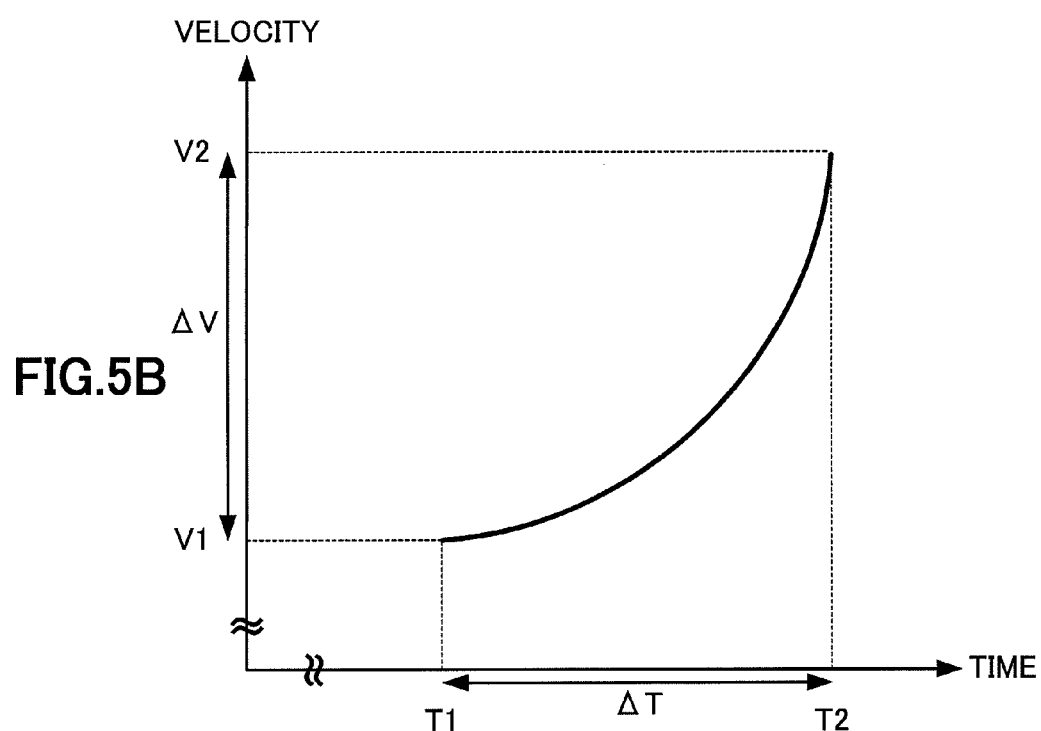
FIG. 5B is a diagram showing an example of temporal change of posture data indicating speed.

Further, for example, the calculating unit 302 can calculate the amount of change of the posture over a predetermined period of time, by using only the data representing the acceleration in the posture data 350. FIG. 5A is an example graph of a temporal change of the posture data 350 representing the acceleration, at which the grip module 201 moves, obtained by the accelerometer. FIG. 5B is an example graph of a temporal change of the velocity obtained by integrating the measured accelerations with respect to time. In this way, the amount $\Delta A$ ($=A2-A1$) of change of the acceleration, or the amount $\Delta V$ ($=V2-V1$) of change of the velocity over a time $\Delta T$ ($=T2-T1$) can be obtained. In the same manner, the calculating unit 302 can calculate the amount $\Delta A$ of change of the acceleration or the amount $\Delta V$ of change of the velocity over an arbitrary period of time.

The calculating unit 302 may use the difference between the posture data 350 at different timings T1 and T2 as an amount of change, or may calculate an amount of change by another calculation manner. For example, as indicated by [Equation 1], the calculating unit 302 may calculate the amount of change of the posture data 350 over each unit section (unit time) between the timing T1 and the timing T2, and divide the sum of the amounts of change of all the sections by the number of the sections to use the result (arithmetic average) as the amount of change that should be calculated.

$$\text{Amount of Change of Posture(Arithmetic Average)} = (\Sigma Ci)/N \qquad \text{[Equation 1]}$$

where N is the number of sections represented by an integer equal to or greater than 1, "i" is an integer equal to or greater than 1 and equal to or smaller than N, and $\Sigma$ is the sum of the amount $C_i$ of change of the posture in a section "i" in $1 \leq i \leq N$.

Further, as indicated by [Equation 2], the calculating unit 302 may calculate the amount of change of the posture by taking into consideration a weight $G_i$ (equal to or greater than 0 and equal to or smaller than 1), which is preset for each section.

$$\text{Amount of Change of Posture(Arithmetic Average)} = (\Sigma(G_i \times C_i))/N \qquad \text{[Equation 2]}$$

The weight $G_i$ is pre-stored in the storage unit 301.

Further, for example, as indicated by [Equation 3], the calculating unit 302 may use the standard deviation $\sigma$ of the amounts of change of the posture of the sections "i" between the timing T1 and the timing T2 as the amount of change of the posture that should be calculated.

$$\sigma^2 = (\Sigma(C_i - C_a)^2)/N \qquad \text{[Equation 3]}$$

where $C_a$ is the arithmetic average calculated by [Equation 1] or [Equation 2], and the operator "^" is a power (e.g., X^Y represents X to the Y-th power).

The variance $\sigma^2$ of [Equation 3] may be used as the amount of change of the posture that should be calculated.

Further, for example, as indicated by [Equation 4], the calculating unit 302 may use the RMS (Root Mean Square) of the amounts of change of the posture of the sections "i" between the timing T1 and the timing T2 as the amount of change of the posture that should be calculated.

$$RMS^2 = (\Sigma(C_i^2))/N \qquad \text{[Equation 4]}$$

The equations for calculating the amount of change of the posture shown above are sheer examples.

The calculating unit 302 does not have to calculate the amount of change of the posture by using all the posture data 350 for the predetermined period of time stored in the storage unit 301, but may calculate the amount of change of the posture by sampling specific ones of the posture data 350, by using [Equation 1] to [Equation 4] or the like. For example, in order to calculate the amount of change of the posture, the calculating unit 302 may skip some of the posture data 350 stored in the storage unit 301 and use the rest, or may skip any posture data 350 that represents a statistically unique value.

The calculating unit 302 can also calculate the amount of change of the angular acceleration or the angular velocity over a predetermined period of time in the same manner. Since the data measured by the inclination sensor, the accelerometer, and the angular accelerometer are obtained at cyclic timings of vertical synchronization interrupts, or the like, the temporal change of the inclination, the acceleration, the velocity, the angular acceleration, and the angular velocity is plotted by a set of discrete points in a strict sense. However, FIG. 4A, FIG. 5A, or FIG. 5B shows the temporal change continuously to make the present invention more understandable.

When a pressing operation by the user to any key on the grip module 201 is detected, the estimating unit 303 estimates the intensity of the pressing operation of the user from the amount of change of the posture data 350 calculated by the calculating unit 302. The CPU 101 and the controller 105 operate in cooperation to function as the estimating unit 303.

To be more specific, the estimating unit 303 estimates the intensity of the user's pressing operation to be larger as the amount of change of the posture data 350 calculated by the calculating unit 302 is larger. For example, when the "A" button 204 is pressed, the estimating unit 303 estimates the pressing to the "A" button 204 to be stronger as the amount of change of the inclination indicated by the posture data 350 is larger. In other words, when the "A" button 204 is pressed by the user, the estimating unit 303 estimates the pressing to the "A" button 204 to be stronger as the range of swing of the grip module 201 is larger. Typically, the intensity estimated by the estimating unit 303 monotonically increases with respect to the level of the amount of change of the posture data 350.

For example, FIG. 6A is an example table showing the correspondence relationship between amounts of change of the posture data 350 (e.g., inclination) and pressing operation information 370 representing results of estimation by the estimating unit 303. In this example, the estimating unit 303 sections the amount of change of the posture data 350 into four stages and estimates a pressing intensity according to each stage. This table is one example, and the number of stages and the correspondence relationship are arbitrary. Further, the estimating unit 303 may not use stage sectionalization, but estimate the level of the amount of change as the intensity of a pressing operation.

Further, the estimating unit 303 may estimate the intensity of a pressing operation of the user to be larger, as an amount of change of the acceleration, the velocity, the angular acceleration, or the angular velocity calculated by the calculating unit 302 is larger. The estimating unit 303 may estimate the intensity of a pressing operation based on a combination of arbitrary parameters among the inclination, the acceleration, the velocity, the angular acceleration, and the angular velocity, such as the combination of the inclination and the acceleration. In the present embodiment, the estimating unit 303 estimates a pressing intensity by using data representing inclination in the posture data 350.

The estimating unit 303 may estimate the intensity of a pressing operation to an arbitrary key among the keys provided on the grip module 201. In the present embodiment, the estimating unit 303 estimates the intensity of pressing the "A" button 204, but may estimate the intensity of pressing any other button or key such as the cross-shaped key 203, the "B" button 205, various buttons 206, etc.

Figure 7:
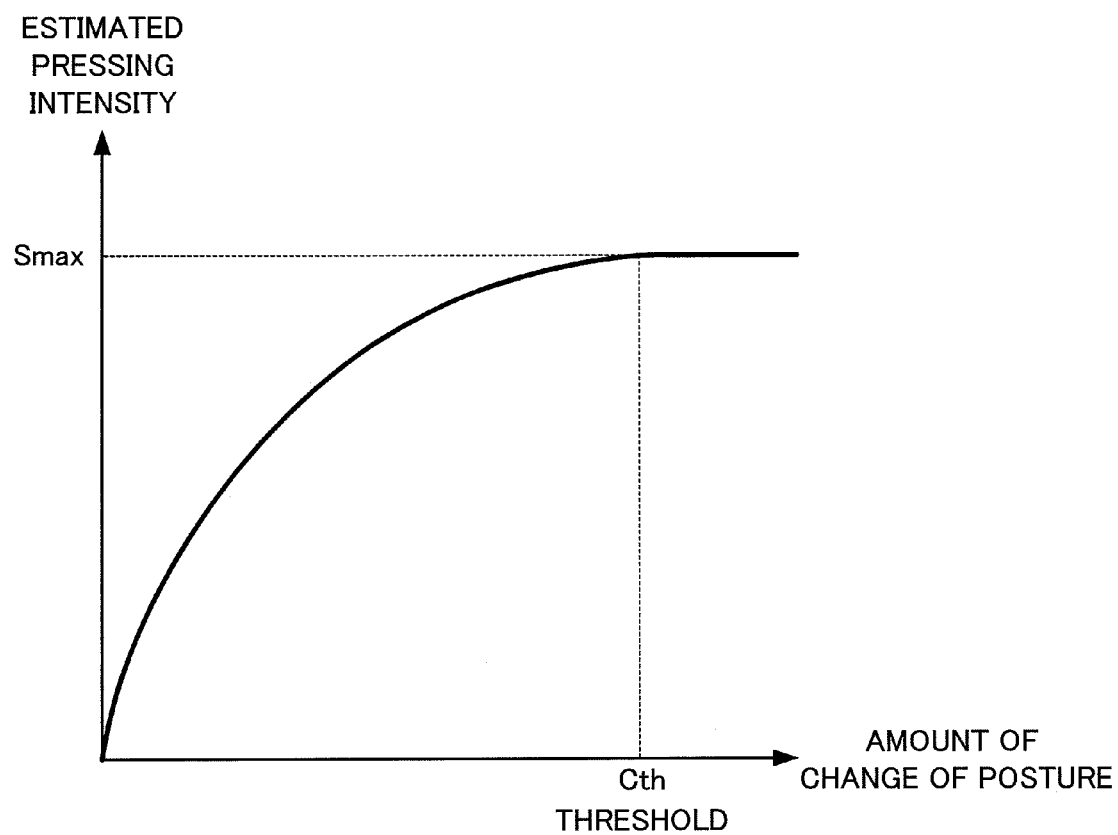
FIG. 7 is a conceptual diagram showing a relationship between amounts of change of the posture and pressing intensities to be estimated.

In a case where an amount of change calculated by the calculating unit 302 is equal to or larger than a predetermined threshold Cth, the estimating unit 303 may estimate the intensity of the user's pressing operation to be a predetermined maximum intensity. FIG. 7 is a conceptual diagram showing the relationship between amounts of change of the posture calculated by the calculating unit 302 and pressing intensities to be estimated by the estimating unit 303. The estimating unit 303 estimates the intensity of a pressing operation as a value that is monotonically larger as the amount of change is larger, and when the amount of change is the predetermined threshold Cth, estimates the intensity of a pressing operation to be the maximum value Smax. As this example, an upper limit value of the pressing intensity to be estimated by the estimating unit 303 may be set.

The estimating unit 303 may preliminarily define some ranges for the amount of change of the posture as shown in FIG. 6A and associate each range with pressing operation information 370 that specifies the intensity as strong, weak, etc., or as shown in FIG. 7, may preliminarily define a function that returns a unique intensity to an arbitrary amount of change and obtain pressing operation information 370 that is specified by a value that indicates the intensity returned from the predetermined function (the value being equal to or larger than 0 and equal to or smaller than the maximum value Smax).

In a case where an amount of change of the posture data 350 calculated by the calculating unit 302 is equal to or greater than the predetermined threshold Cth, the determining unit 304 determines that the user has given a shaking operation. The CPU 101 and the controller 105 operate in cooperation to function as the determining unit 304.

To be more specific, in a case where an amount of change of the posture data 350 calculated by the calculating unit 302 is equal to or greater than the predetermined threshold Cth, the determining unit 304 determines that the user has given a shaking operation. On the other hand, in a case where an amount of change of the posture data 350 is smaller than the threshold Cth, the determining unit 304 determines that the user has not given a shaking operation. For example, FIG. 6B is an example table showing the correspondence relationship between amounts of change of the posture data 350 (e.g., inclination) and shaking operation information 380 that shows results of determination by the determining unit 303. In this example, the determining unit 303 defines two-stage sectionalization for the amount of change of the posture data 350, and determines whether the grip module 201 is shaken by the user or not according to the stages. FIG. 6B shows one example, and the number of stages and the correspondence relationship are arbitrary. The determining unit 304 may not use stage sectionalization, but equate a level of an amount of change with the intensity of a shaking operation (or with presence or absence of a shaking operation).

Alternatively, in a case where an amount of change of the posture data 350 calculated by the calculating unit 302 is equal to or greater than the predetermined threshold Cth, the determining unit 304 may determine the intensity of a shaking operation according to the amount of change of the posture data 350. For example, FIG. 6C is an example table showing the correspondence relationship between amounts of change of the posture data 350 (e.g., inclination) and shaking operation information 380. In this example, the determining unit 304 defines three-stage sectionalization for the amount of change of the posture data 350, and determines the intensity of a shaking operation according to the stages. FIG. 6C is one example, and the number of stages and the correspondence relationship are arbitrary. The determining unit 304 may not use stage sectionalization, but equate a level of an amount of change with the intensity of a shaking operation (the intensity being a value indicating how widely the grip module is shaken).

The output unit 305 outputs a result of estimation by the estimating unit 303, i.e., pressing operation information 370 that specifies the intensity of a user's pressing operation. For example, in a case where the estimating unit 303 estimates a pressing intensity according to the amount of change of the posture data 350 as shown in FIG. 6A, the output unit 305 outputs pressing operation information 370 that specifies any of "weakly pressed", "rather weakly pressed", "rather strongly pressed", and "strongly pressed", as an estimation result. The output unit 305 may output the amount of change of the posture calculated by the calculating unit 302 as pressing operation information 370 that specifies the intensity of a pressing operation.

In a case where the determining unit 304 determines that an amount of change of the posture is equal to or greater than the threshold Cth (that the user has given a shaking operation), the output unit 305 further outputs shaking operation information 380 that specifies the amount of change calculated by the calculating unit 302 as the intensity of a shaking operation. For example, in a case where the determining unit 304 determines whether the grip module 201 is shaken or not according to the amount of change of the posture data 350 as shown in FIG. 6B, the output unit 305 outputs shaking operation information 380 that specifies any of "not shaken" and "shaken" as a determination result. The output unit 305 may output the amount of change of the posture calculated by the calculating unit 302 as shaking operation information 380 that specifies the intensity of a shaking operation.

Alternatively, for example, the determining unit 304 may determine the presence or absence of a shaking operation according to an amount of change of the posture data 350 as shown in FIG. 6B, and in a case where the determining unit 304 determines that a shaking operation has been given, the output unit 305 may obtain the intensity of the shaking operation according to the amount of change and output shaking operation information 380 that shows the obtained intensity of the shaking operation.

As can be understood, the output unit 305 can output pressing operation information 370 and shaking operation information 380 independently from each other. That is, the output unit 305 can output such information as "strongly pressed and not shaken" or "strongly pressed and shaken". The CPU 101 functions as the output unit 305.

Alternatively, the output unit 305 may output pressing operation information 370 or shaking operation information 380 by combining estimation results by the estimating unit 303 and determination results by the determination unit 304 as shown in FIG. 6D and FIG. 6E. For example, according to FIG. 6D, the output unit 305 outputs pressing operation information 307 that specifies "weakly pressed" when the amount of change of the posture data 350 (e.g., inclination) is smaller than C2, pressing operation information 370 that specifies "strongly pressed" when the amount of change is equal to or greater than C2 and smaller than the threshold Cth, or shaking operation information 380 that specifies "shaken" when the amount of change is equal to or greater than the threshold Cth. According to FIG. 6E, the output unit 305 outputs pressing operation information 370 when the amount of change of the posture data 350 (e.g., inclination) is smaller than the threshold Cth, shaking operation information 380 that specifies "weakly shaken" when the amount of change is equal to or greater than the threshold Cth and smaller than C4, or shaking operation information 380 that specifies "strongly shaken" when the amount of change is equal to or greater than C4. In this way, the output unit 305 may output either one of pressing operation information 370 and shaking operation information 380. These diagrams are examples, and the number of stages and the correspondence relationship are arbitrary. The output unit 305 may not use stage sectionalization but equate the level of an amount of change with the intensity of a pressing operation or with the intensity of a shaking operation.

The information that represents the correspondence relationships shown in FIG. 6A to FIG. 6E is preliminarily stored in the storage unit 301 in the form of table or database, and the estimating unit 303 or the determining unit 304 performs estimation or determination by reading the information representing the correspondence relationships from the storage unit 301 as needed. The estimating unit 303 or the determining unit 304 may perform estimation or determination by executing a predetermined program in which data representing such correspondence relationships are originally stored. However, in a case where stage sectionalization of strong, weak, etc. is not used and an amount of change of the posture calculated by the calculating unit 302 is seen as the intensity of a pressing operation or the intensity of a shaking operation, the storage unit 301 may not need to preliminarily store information showing such correspondence relationships.

(Estimation/Determination Process)

Figure 8:
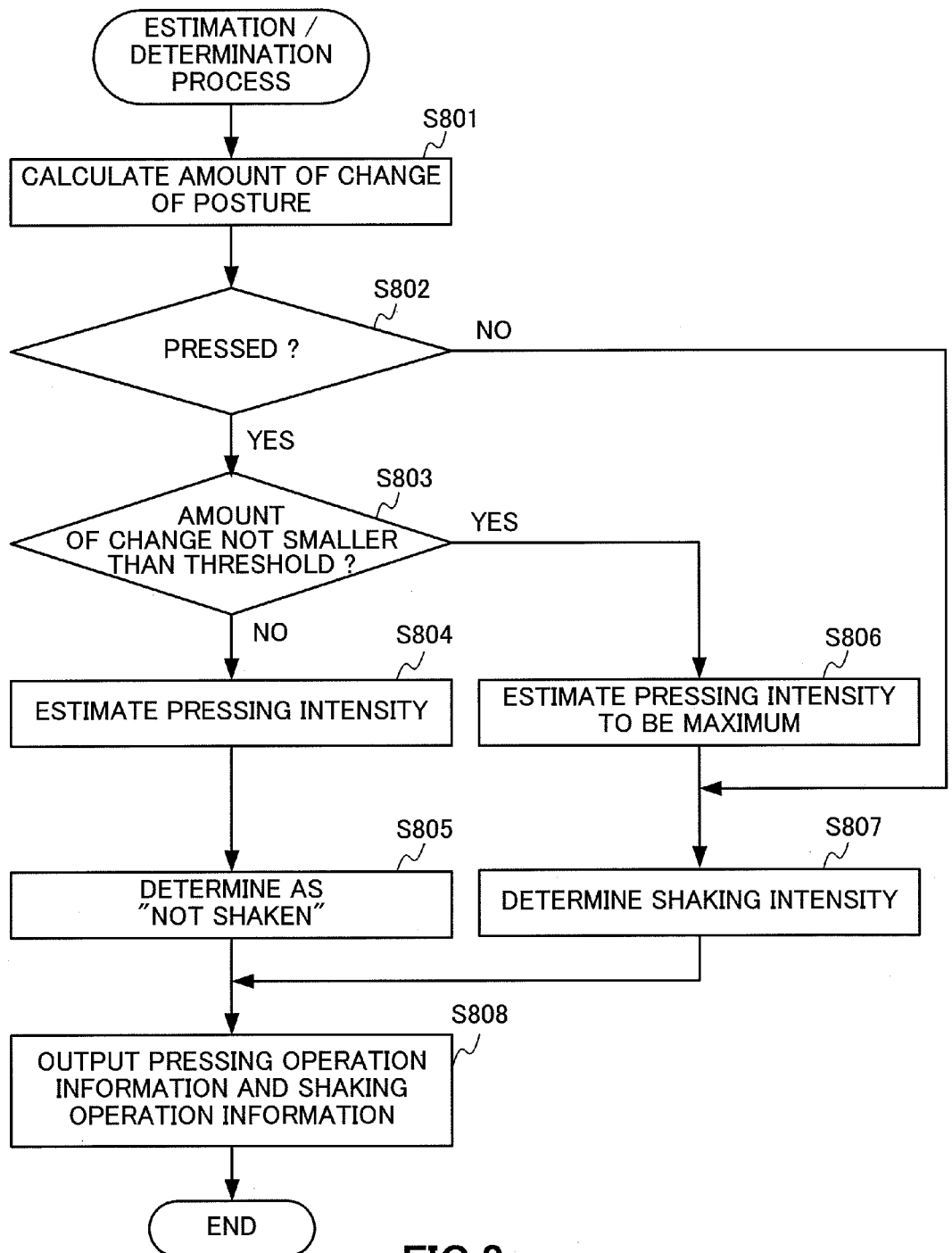
FIG. 8 is a flowchart for explaining a process performed by each unit of an input device according to Example 1.

Next, the process performed by each unit of the input device 300 will be explained with reference to the flowchart of FIG. 8. In the following explanation, as an example, it is assumed that the estimating unit 303 or the determining unit 304 estimates pressing intensities or determines shaking operation intensities based on the correspondence relationship as shown in FIG. 6E.

Under the control of the CPU 101, the grip module 201 detects the posture of the grip module 201 at regular timings such as vertical synchronization interrupts, and stores the obtained posture data 350 in the storage unit 301. For example, the posture data 350 includes the inclination of the grip module 201, data indicating the acceleration and velocity at which the grip module 201 moves, data indicating the angular acceleration and acceleration at which the grip module 201 rotates, etc. In the present embodiment, the storage unit 301 stores some posture data 350 amounting to a predetermined period of time and indicating the inclination of the grip module 201, and the estimating unit 303 or the determining unit 304 estimates pressing intensities or determines whether a shaking operation is given or not according to the amount of change, over the predetermined period of time, of the posture data 350 indicating the inclination. However, this is merely an example, and it is possible to employ an embodiment in which pressing intensities are estimated or whether a shaking operation is given or not is determined according to the posture data 350 indicating the acceleration and velocity at which the grip module 201 moves and the angular acceleration and angular velocity at which the grip module 201 rotates. The grip module 201 may detect its posture at arbitrary timings, but it is desirable that the controller 105 detect the posture at predetermined regular intervals.

First, the calculating unit 302 calculates the amount of change, over the predetermined period of time, of the posture data 350 stored in the storage unit 301 (step S801). For example, the calculating unit 302 calculates the difference between the inclination or the like of the grip module 201 at a predetermined timing T1 and that at a predetermined timing T2, or calculates the amount of change of the posture such as the inclination by performing a statistical calculation as represented by [Equation 1] to [Equation 4] shown above.

Next, the controller 105 determines whether any key (for example, the "A" button 204) disposed on the grip module 201 is pressed or not (step S802).

In a case where it is determined that any key is pressed (step S802; YES), the estimating unit 303 determines whether or not the amount of change of the posture calculated by the calculating unit 302 at step S801 is equal to or greater than the predetermined threshold Cth (step S803).

In a case where it is determined that the amount of change of the posture is neither equal to nor greater than the threshold Cth (step S803; NO), the estimating unit 303 estimates the pressing intensity according to the amount of change of the posture calculated by the calculating unit 302 (step S804). For example, the estimating unit 302 obtains the pressing intensity according to the calculated amount of change based on the correspondence relationship shown in FIG. 6E. The estimating unit 303 may use the amount of change of the posture calculated by the calculating unit 302 as the pressing intensity. Then, the determining unit 304 determines that the grip module 201 is not shaken by the user (step S805).

In a case where the amount of change of the posture is equal to or greater than the threshold Cth (step S803; YES), the estimating unit 303 estimates the pressing operation of the user to be the predetermined maximum intensity (step S806). The determining unit 304 determines that the grip module 201 is shaken by the user, and determines the intensity of the shaking operation according to the level of the amount of change of the posture calculated by the calculating unit 302 (step S807).

On the other hand, in a case where it is determined at step S802 that no key is pressed (step S802; NO), the determining unit 304 determines the intensity of a shaking operation according to the level of the amount of change of the posture calculated by the calculating unit 302 (step S807).

Then, the output unit 305 outputs pressing operation information 370 that indicates the pressing intensity estimated at step S804 or S806, and shaking operation information 380 that indicates the intensity of the shaking operation determined at step S805 or S807 (or whether a shaking operation has been given or not) (step S808). The output unit 305 may output only shaking operation information 380 in a case where the amount of change of the posture is equal to or greater than the predetermined threshold Cth, and output only pressing operation information 370 otherwise.

The determining unit 304 may determine at step S807 whether a shaking operation has been given or not, and the output unit 305 may obtain the intensity of the shaking operation according to the amount of change of the posture and output the obtained intensity at step S808.

Alternatively, the estimating unit 303 may estimate the amount of change of the posture calculated by the calculating unit 302 to be the pressing intensity at step S804 and step S806, and the determining unit 304 may determine the amount of change of the posture to be the intensity of a shaking operation step S805 and step S807.

As can be understood, according to the present embodiment, the input device 300 can easily estimate the intensity of a user's pressing operation to an operation button or the like based on the amount of change of the posture of the grip module 201 over the predetermined period of time. It is not necessary for the input device 300 to have a dedicated sensing device such as a pressure sensor for obtaining pressing intensities. Since the input device 300 determines that the grip module 201 is shaken when an amount of change is equal to or greater than the predetermined threshold, the input device 300 can easily estimate the intensity of a pressing operation and can also easily determine the intensity of a shaking operation.

For example, as trying to press a key (for example, the "A" button 204) disposed on the grip module 201 more strongly, ordinary users tend to gain a larger momentum and get into a movement like shaking the grip module 201 (in other words, a movement that causes a fluctuation of the posture of the grip module 201). Hence, with the use of the present invention, it is possible to estimate how strongly the user was trying to press a key, based on the transition of the posture of the grip module 201.

In the present embodiment, the input device 300 both estimates the intensity of a pressing operation and determines the intensity of a shaking operation, but it may be configured to perform only the estimation of the intensity of a pressing operation. In this case, the input device 300 may not include the determining unit 304 or may have a more simplified configuration.

Example 2

Next, another embodiment of the present invention will be explained. The present embodiment is different from the embodiment described above in that the input device 300 performs an estimation/determination process by further using the position of the grip module 201 with respect to the light emitting module 251, which is obtained based on the positions at which the light emitting diodes 252 are captured in an image captured by the CCD camera 202 of the grip module 201. That is, the estimation/determination process described above may be performed such that the estimating unit 303 or the determining unit 304 estimates a pressing intensity or determines the intensity of a shaking operation based on both the posture and the position. Detailed explanation will now be given.

As described above, the grip module 201 detects the posture of the grip module 201 and a user's pressing operation to any key disposed on the surface of the grip module 201, and in addition, the position of the grip module 201. That is, the grip module 201 is a detecting device that detects postures, positions, and pressing operations. The CPU 101 acquires data representing the detection result and stores it in the storage unit 301.

The storage unit 301 stores a track of the posture and the position, amounting to a predetermined period of time, detected by the grip module 201. For example, the grip module 201 detects both the posture and the position of the grip module 201 at regular timings such as vertical synchronization interrupts, and the storage unit 301 stores some pieces of both the posture data 350 and the position data 360, which amount to a predetermined number of measurements and show the results of the measurements, as a history record. The storage unit 301 stores latest N pieces of the position data 360 in association with the posture data 350.

The calculating unit 302 calculates an amount of change, over a predetermined period of time, of the posture of the grip module 201, from the posture data 350 amounting to the predetermined period of time stored in the storage unit 301. The calculating unit 302 further calculates an amount of change, over a predetermined period of time, of the position of the grip module 201 from the position data 360 amounting to the predetermined period of time stored in the storage unit 301. The calculating unit 302 can calculate an amount of change of the position by using the same manner as the manner of calculating an amount of change of the posture described above. That is, the calculating unit 302 can calculate an amount of change of the position by calculating a statistic value such as difference, arithmetic average, standard deviation, variance, or root-mean-square of position over a predetermined period of time.

When the grip module 201 detects a user's pressing operation to any key on the grip module 201, the estimating unit 303 estimates the intensity of the user's pressing operation from an amount of change of the posture data 350 and an amount of change of the position data 360 calculated by the calculating unit 302. For example, the estimating unit 303 estimates the intensity of the user's pressing operation according to the amount of change of the posture data 350, by using a correspondence relationship as shown in FIG. 6A. The estimating unit 303 may estimate an amount of change of the posture data 350 as the intensity of a pressing operation. In a case where an amount of change of the position data 360 calculated by the calculating unit 302 is equal to or greater than a predetermined threshold Pth, the estimating unit 303 estimates the intensity of a user's pressing operation to be a predetermined maximum intensity (upper limit value).

In a case where an amount of change of the posture data 350 calculated by the calculating unit 302 is equal to or greater than a predetermined threshold Cth, the determining unit 304 determines that the user has given a shaking operation. In a case where an amount of change of the position data 360 calculated by the calculating unit 302 is equal to or greater than the threshold Pth, the determining unit 304 determines that the user has given a shaking operation.

The output unit 305 outputs pressing operation information 370 that specifies the intensity of the user's pressing operation estimated by the estimating unit 303 and shaking operation information 380 that specifies the intensity of the user's shaking operation determined by the determining unit 304.

Figure 9:
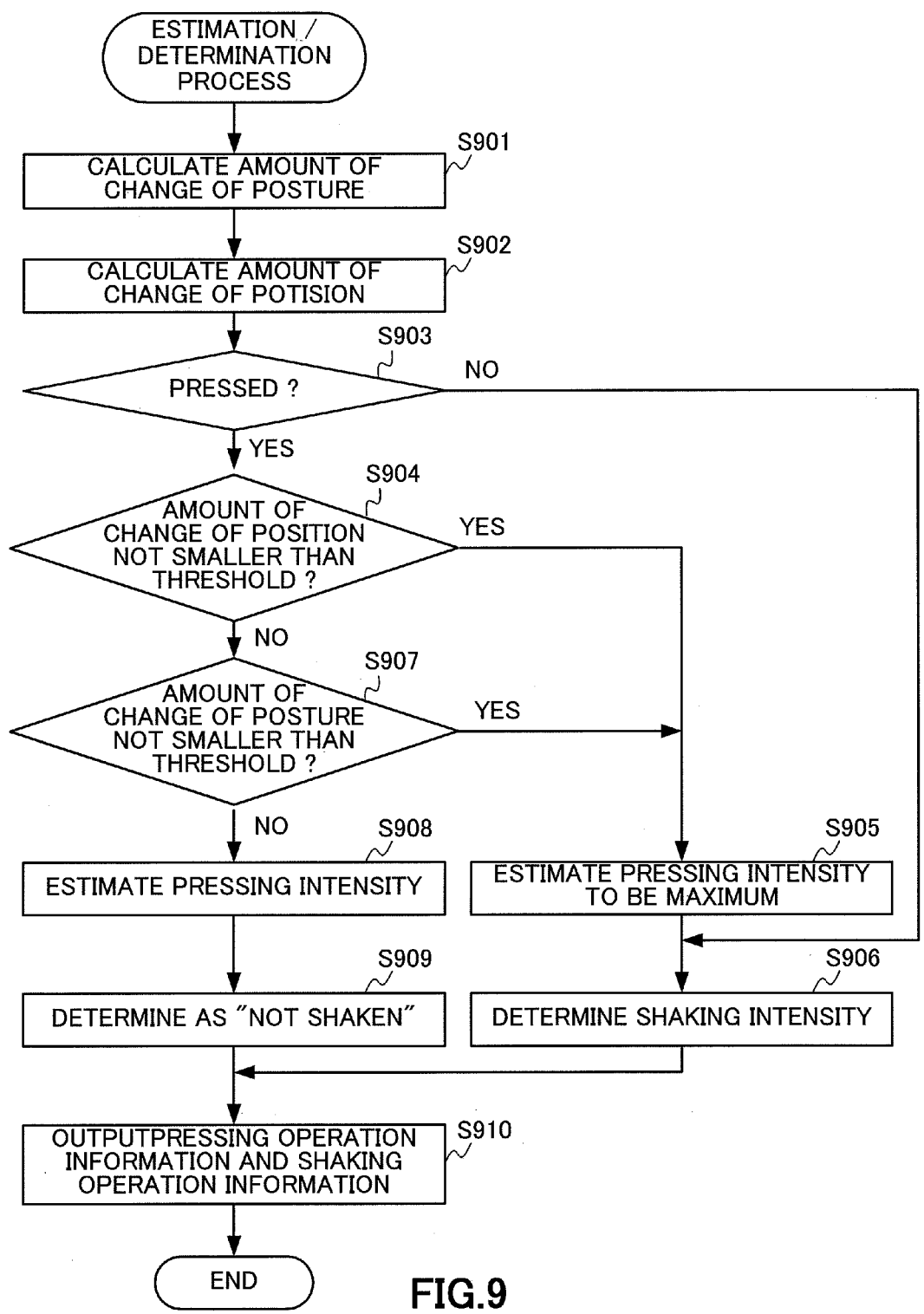
FIG. 9 is a flowchart for explaining a process performed by each unit of an input device according to Example 2.

Next, the process performed by each unit of the input device 300 according to the present embodiment will be explained with reference to the flowchart of FIG. 9.

Under the control of the CPU 101, the grip module 201 detects the posture and position of the grip module 201 at regular timings such as vertical synchronization interrupts. The CPU 101 acquires data representing the detection results, and stores the posture data 350 and the position data 360 of the grip module 201 in the storage unit 301. The posture data 350 includes all or any of the inclination of the grip module 201, data representing the acceleration and velocity at which the grip module 201 moves, and the angular acceleration and angular velocity at which the grip module 201 rotates. The controller 105 detects the posture and position at arbitrary timings but it is desirable that the grip module 201 detect the posture and position at predetermined regular intervals.

First, the calculating unit 302 calculates an amount of change, over a predetermined period of time, of the posture data 350 (i.e., inclination) stored in the storage unit 301 (step S901). The calculating unit 302 further calculates an amount of change, over a predetermined period of time, of the position data 360 stored in the storage unit 301 (step S902).

The controller 105 determines whether any key (for example, the "A" button 204) is pressed or not (step S903).

In a case where it is determined that any key is pressed (step S903; YES), the estimating unit 303 determines whether or not the amount of change of the position calculated by the calculating unit 302 at step S902 is equal to or greater than the predetermined threshold Pth (step S904).

In a case where it is determined that the amount of change of the position is equal to or greater than the threshold Pth (step S904; YES), the estimating unit 303 estimates the user's pressing operation to be the predetermined maximum intensity (step S905). The determining unit 304 determines that the grip module 201 is shaken by the user and further determines the intensity of the shaking operation according to the level of the amount of change of the posture calculated by the calculating unit 302 (step S906). Here, instead of determining the intensity of the shaking operation, the determining unit 304 may determine whether or not the amount of change of the posture is equal to or greater than the predetermined threshold Cth (that is, whether or not a shaking operation has been given).

In a case where it is determined that the amount of change of the position is smaller than the threshold Pth (step S904; NO), the estimating unit 303 determines whether or not the amount of change of the posture calculated by the calculating unit 302 at step S902 is equal to or greater than the predetermined threshold Cth (step S907).

In a case where it is determined that the amount of change of the posture is equal to or greater than the threshold Cth (step S907; YES), the estimating unit 303 estimates the intensity of a pressing operation to be the maximum intensity (step S905), and the determining unit 304 determines the intensity of a shaking operation according to the level of the amount of change of the posture (step S906).

In a case where it is determined that the amount of change of the posture is smaller than the threshold Cth (step S907; NO), the estimating unit 303 estimates a pressing intensity according to the amount of change of the posture calculated by the calculating unit 302 (step S908). The estimating unit 303 may estimate the amount of change of the posture as the intensity of the pressing operation. Further, the determining unit 304 determines that the grip module 201 is not shaken by the user (step S909).

On the other hand, in a case where it is determined at step S903 that no key is pressed (step S903; NO), the determining unit 304 determines the intensity of a shaking operation according to the level of the amount of change of the posture calculated by the calculating unit 302 (step S906). The determining unit 304 may determine the amount of change of the posture as the intensity of the shaking operation.

Then, the output unit 305 outputs pressing operation information 370 that specifies the pressing intensity estimated at step S905 or S908, and shaking operation information 380 that specifies the intensity of the shaking operation determined at step S906 or S909 (or whether or not a shaking operation has been given) (step S910).

As can be understood, according to the present embodiment, the input device 300 can easily estimate the intensity of a user's pressing operation to an operation button or the like based on an amount of change of the posture and an amount of change of the position of the grip module 201 over a predetermined period of time. The input device 300 needs not include a dedicated sensing device such as a pressure sensor for obtaining pressing intensities. Further, since the input device 300 determines that the grip module 201 is shaken when an amount of change is equal to or greater than a predetermined threshold, it can easily estimate the intensity of a pressing operation and also can easily determine the intensity of a shaking operation. Furthermore, it becomes easier for the input device 300 to distinguish between a user's pressing operation and a user's shaking operation based on an amount of change of the posture and an amount of change of the position.

Example 3

Next, another embodiment of the present invention will be explained. The present embodiment is different from the embodiments described above in that the estimating unit 303 estimates the intensity of a pressing operation after a predetermined waiting period passes after the grip module 201 detects a pressing operation to any key. That is, in the present embodiment, the intensity of a pressing operation estimated by the estimating unit 303 represents a quantity that is determined with not only a track of the posture (or both the posture and the position) before any key is pressed but also a track of the posture (or both the posture and the position) after any key is pressed taken into consideration. Detailed explanation will be given below.

Likewise the embodiments described above, the storage unit 301 stores a track of the posture and the position, amounting to a predetermined period of time Tr, detected by the grip module 201.

When a user's pressing operation to any key on the grip module 201 is detected, the estimating unit 303 estimates the intensity of the user's pressing operation from an amount of change of the posture data 350 (or both an amount of change of the posture data 350 and an amount of change of the position data 360) calculated after a predetermined waiting period Tw passes by the calculating unit 302. The length of the waiting period Tw can be arbitrarily set, but it is desirable that "the waiting period" Tw<"the predetermined period of time" Tr should be satisfied.

The other respects of the input device 300 are the same as the embodiments described above, and will not be explained again.

Figure 10:
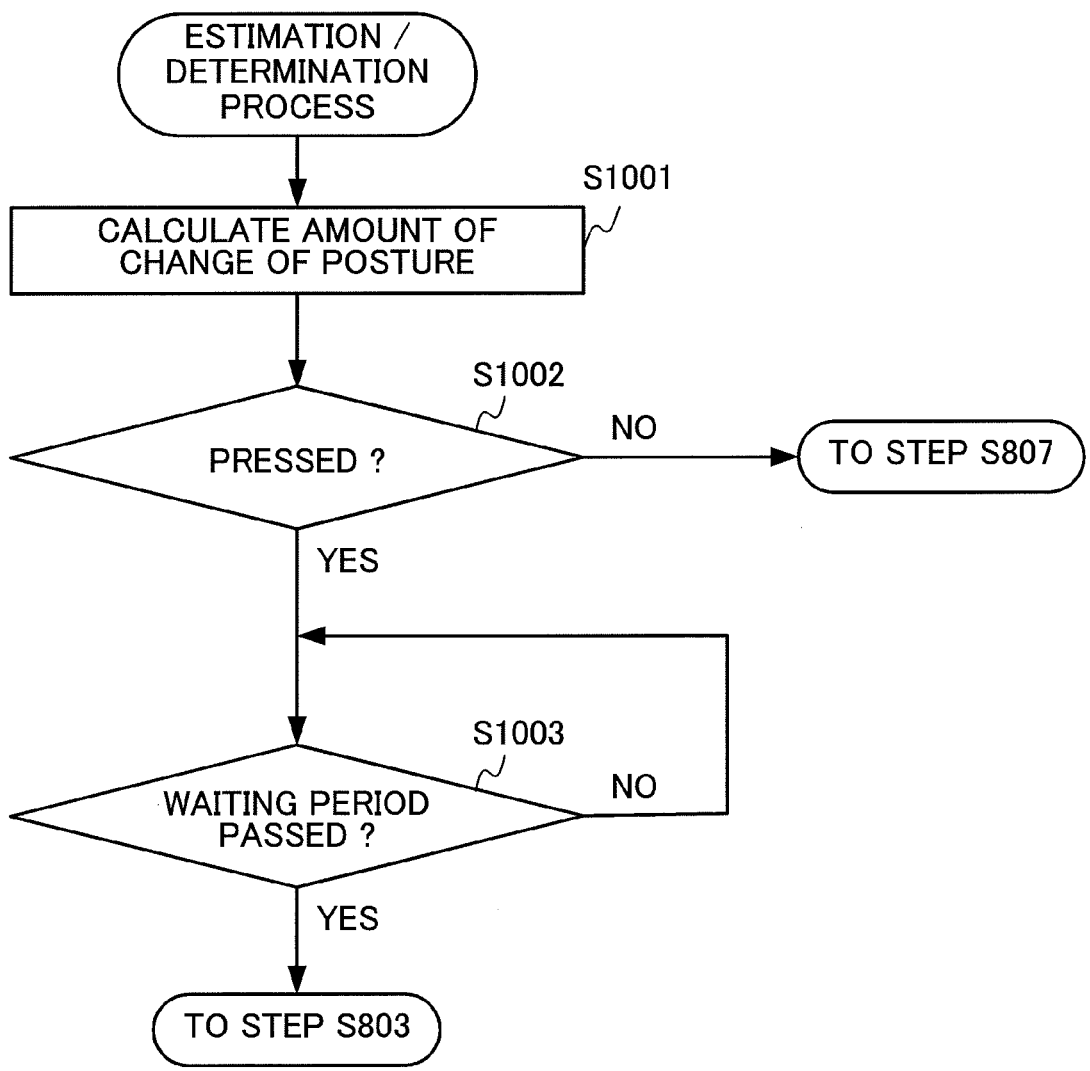
FIG. 10 is a flowchart for explaining a process performed by each unit of an input device according to Example 3.

Next, the process performed by each unit of the input device 300 according to the present embodiment will be explained with reference to the flowchart of FIG. 10. The present embodiment can be implemented in combination with each of the embodiments described above, and a scheme of the present embodiment combined with Example 1 will be explained here as an example.

First, the calculating unit 302 calculates the amount of change, over a predetermined period of time, of the posture data 350 stored in the storage unit 301 (step S1001).

Next, the grip module 201 determines whether any key (for example, the "A" button 204) disposed on the grip module 201 is pressed or not (step S1002).

In a case where it is determined that no key is pressed (step S1002; NO), the input device 300 proceeds to step S807. The process from step S807 is the same as in the embodiment described above, and will not be explained again.

In a case where it is determined that any key is pressed (step S1002; YES), the estimating unit 303 determines whether the predetermined waiting period Tw has passed or not since the grip module 201 detected the pressing operation (step S1003). In a case where the waiting period Tw has not yet passed (step S1003; NO), the estimating unit 303 waits until the waiting period Tw has passed (back to step S1003).

In a case where the waiting period Tw has passed (step S1003; YES), the input device 300 proceeds to step S803. The process from step S803 is the same as in the embodiment described above, and will not be explained again.

For example, as trying to press any key (for example, the "A" button 204) disposed on the grip module 201 more strongly, ordinary users tend to gain a larger momentum and get into a movement like shaking the grip module 201 (in other words, a movement that causes a fluctuation of the posture of the grip module 201). Such a movement of the user can be broadly divided into a pre-event movement (preliminary movement) before any key is pressed and a post-event movement after any key is pressed. According to the present embodiment, since the estimating unit 303 can estimate the intensity of a pressing operation based on the amount of change of the posture and of the position of the grip module 201 by taking into consideration not only the pre-event movement of the user but also the post-event movement of the user, the estimation can better reflect the situation.

Example 4

Next, another embodiment of the present invention will be explained. The present embodiment is different from the embodiments described above in that the calculating unit 302 calculates an amount of change over each of a plurality of time regions to which the posture data 350 (and the position data 360) are distributed. Detailed explanation will be given below.

Figure 11A:
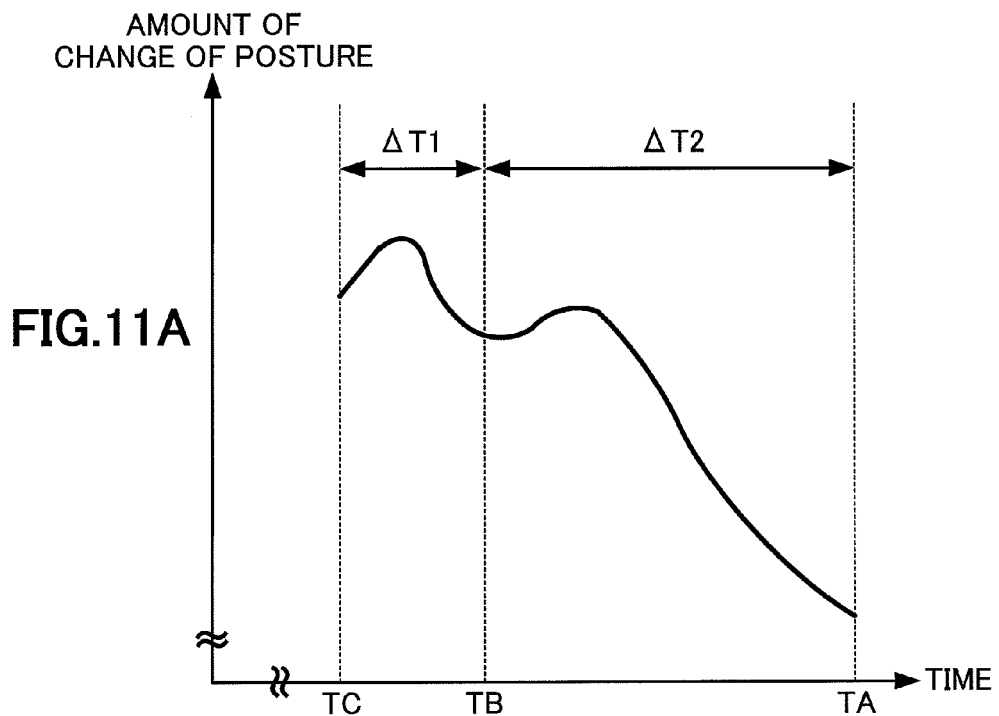
FIG. 11A is a diagram showing an example of temporal change of posture data, where the posture data are distributed to predetermined sections.
Figure 11B:
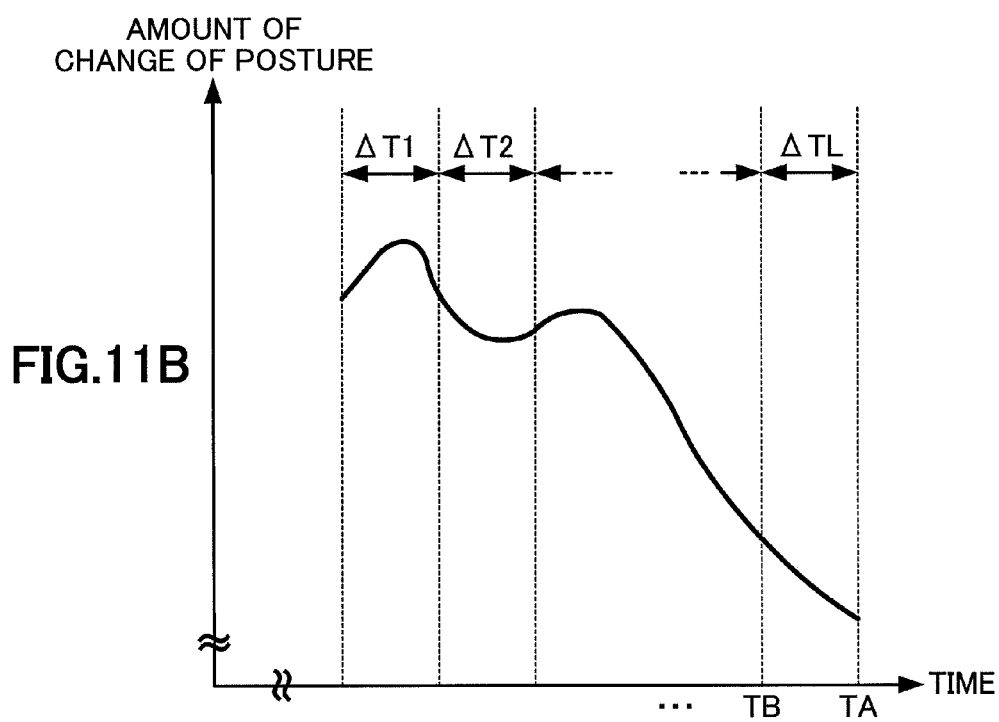
FIG. 11B is a diagram showing an example of temporal change of posture data, where the posture data are distributed to predetermined sections.

The calculating unit 302 distributes the posture data 350 amounting to a predetermined period of time stored in the storage unit 301 to predetermined two time regions as shown in FIG. 11A. For example, in a case where a pressing operation is given at a timing TA and the storage unit 301 stores N pieces (N being an integer equal to or greater than 1) of the posture data 350, the calculating unit 302 distributes the oldest M pieces (M being an integer equal to or greater than 1 and equal to or smaller than N) of the posture data 350 to a first section $\Delta T1$ and the rest of the data to a second section $\Delta T2$. The calculating unit 302 distributes the data to two sections in the present embodiment, but may distribute the data to L (L being an integer equal to or greater than 2 and equal to or smaller than N) sections as shown in FIG. 11B. Then, the calculating unit 302 calculates the amount of change of the posture for each section by performing any statistic calculation described above.

When a user's pressing operation is detected, the estimating unit 303 estimates the intensity of the pressing operation based on the amount of change of the posture for each section calculated by the calculating unit 302.

Figure 12:
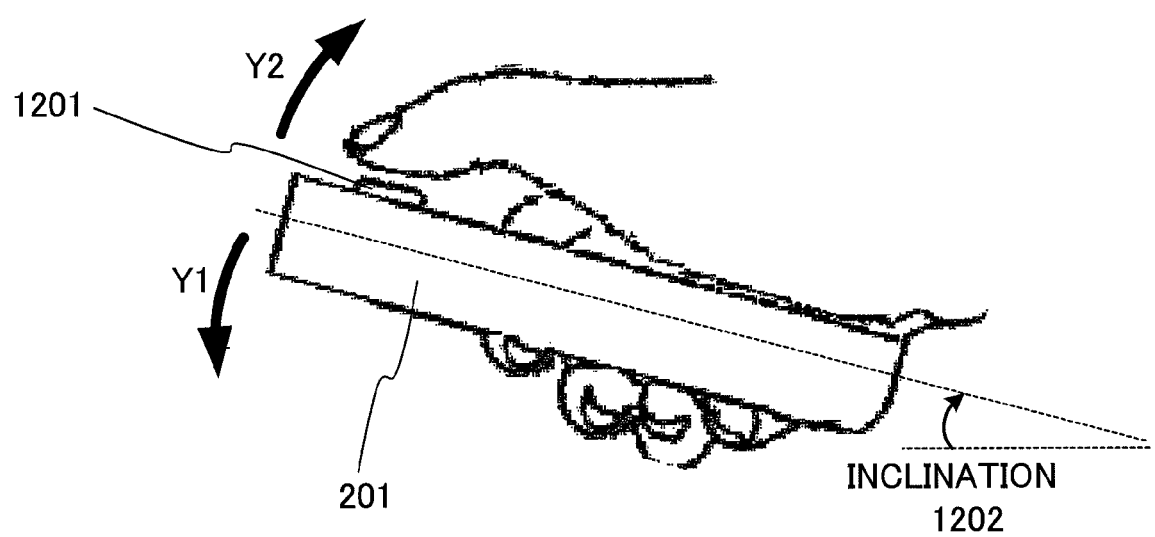
FIG. 12 is a diagram showing an example of the posture of the grip module.

FIG. 12 is a view of the grip module 201 gripped by the user, as seen edge-on. A button 1201 is an arbitrary operation button/operation key, and can be pressed in the direction of the arrow Y1. When the user presses the button 1201 in the Y1 direction, the inclination 1202 changes in the direction of the arrow Y1 or in the direction of the arrow Y2 (i.e., the posture fluctuates) due to the pre-pressing movement (preliminary movement) or the post-pressing movement (momentum). Typically, the more strongly the user tries to press the button 1201, the more apt it is that the user once withdraws the grip module 201 in the direction of the arrow Y2 (preliminary movement) to pick up momentum and presses the button 1201 while shaking the grip module 201 in the direction of the arrow Y1.

Hence, the estimating unit 303 estimates the pressing intensity based on the amount of change of the posture in the Y1 direction in which the button 1201 is pressed and the amount of change of the posture in the reverse Y2 direction. For example, the estimating unit 303 regards the first section $\Delta T1$ as a section corresponding to the preliminary movement, and estimates the pressing intensity based on the amount of change of the posture in the first section $\Delta T1$ and the amount of change of the posture in the second section $\Delta T2$.

Specifically, at step S804 described above, the estimating unit 303 estimates a larger pressing intensity as there is a larger difference between the amount of change, which concerns the direction of change, of the inclination in the first section $\Delta T1$ corresponding to the preliminary movement (i.e., the amount of change being a vector quantity) and the amount of change, which concerns the direction of change, of the inclination in the second section $\Delta T2$ corresponding to the succeeding movement.

Alternatively, at step S804 described above, the estimating unit 303 calculates the ratio between the amount of change of the inclination in the first section $\Delta T1$ corresponding to the preliminary movement and the amount of change of the inclination in the second section $\Delta T2$, and estimates a larger pressing intensity as the amount of change of the inclination in the first section $\Delta T1$ weighs more.

The estimating unit 303 may likewise estimate a pressing intensity by calculating an amount of change of the acceleration or velocity of movement or of the angular acceleration or angular velocity of rotation for each section, not only an amount of change of the inclination.

The present invention is not limited to the embodiments described above, but can be modified or applied in various manners. Any arbitrary combination of the elements of the embodiments described above is possible.

In the embodiments described above, the grip module 201 includes an inclination sensor, an accelerometer, and an angular accelerometer. The grip module 201 may not include all of them, and the estimating unit 303 may not estimate the intensity of a pressing operation by using the amount of change of all of the inclination, the acceleration (or velocity), and the angular acceleration (or angular velocity). Needless to say, the shape or the like of the grip module 201 or of the whole controller 105 is not limited by the present invention.

Each embodiment described above can be applied to input devices for various games. For example, in a shooting game in a virtual space, a game apparatus including the configuration of the input device 300 according to the present invention can estimate the intensity of a pressing operation to any key according to an amount of change of the posture or position calculated by the calculating unit 302 and adjust the power of a gun, a missile, beam, etc. according to the result of the estimation.

For example, in a game in which the grip module 201 is used as a plectrum for playing a musical instrument such as a drum and the user plays the musical instrument by swinging the grip module 201 or pressing a predetermined button, the intensity of a pressing operation to any key is estimated according to an amount of change of the posture or position calculated by the calculating unit 302, and the sound volume of the musical instrument is adjusted according to the result of the estimation. In a case where the amount of change of the posture or position is equal to or greater than a predetermined amount, it is determined that the grip module 201 is swung and the user's operation is an action of swinging the plectrum to beat the drum.

A program for controlling the input device 300 to operate as the whole or part of the input device may be stored in a computer-readable recording medium such as a memory card, a CD-ROM, a DVD, a Magneto Optical disk (MO), etc. and distributed, so that the program may be installed on a different computer to control the computer to operate as the means described above or to perform the process described above.

The program may be stored in a disk device possessed by a server device on the Internet, so that, for example, the program may be embedded on a carrier wave and downloaded into a computer.

The present application claims priority based on Japanese Patent Application No. 2007-052855, the content of which is incorporated herein in its entirety.

INDUSTRIAL APPLICABILITY

As explained above, according to the present embodiment, an input device can estimate the intensity of a user's pressing operation without including a component such as a pressure sensor that directly measures the intensity of a pressing operation.

The invention claimed is:
1. An input device, comprising:
a detecting device that is gripped by a user and detects a posture of the detecting device and a pressing operation of the user;
a storage unit that stores a track of posture, which amounts to a predetermined period of time, detected by the detecting device;
a calculating unit that calculates an amount of change of the posture over the predetermined period of time, from the track of the posture stored in the storage unit;
an estimating unit that estimates an intensity of the pressing operation of the user from the calculated amount of change if the pressing operation is detected;
a determining unit that:
(a) while the pressing operation of the user is being detected and if the calculated amount of change is equal to or greater than a shake predetermined threshold, determines that a shaking operation of the user is detected, sets a current shaking intensity of the shaking operation as a function of the calculated amount of change, and sets a current pressing intensity to a predetermined intensity;
(b) while the pressing operation of the user is being detected and if the calculated amount of change is less than the shake predetermined threshold, determines that a shaking operation of the user is not detected, and determines the current pressing intensity as the intensity estimated by the estimating unit;
(c) while the pressing operation of the user is not detected, determines whether a shaking operation of the user is detected based on the calculated amount of change and sets a current shaking intensity if the shaking operation is detected as a function of the calculated amount of change; and an output unit that outputs pressing operation information that specifies the current pressing intensity of the pressing operation when the pressing operation is detected and shaking operation information when the shaking operation has been detected, the shaking operation information including an indication of the current shaking intensity of the shaking operation.

2. The input device according to claim 1, wherein the estimating unit estimates the intensity of the pressing operation of the user to be larger as the calculated amount of change is larger.

3. The input device according to claim 1, wherein the estimating unit estimates the intensity of the pressing operation of the user to be a predetermined maximum intensity, in a case where the calculated amount of charge is equal to or greater than the predetermined threshold.

4. The input device according to claim 1, wherein the estimating unit estimates the intensity of the pressing operation of the user, from an amount of change that is calculated by the calculating unit after a predetermined waiting period passes after the detecting device detects the pressing operation of the user.

5. The input device according to claim 1, wherein the detecting device further detects a position of the detecting device, the storage unit further stores a track of the position, which amounts to a predetermined period of time, detected by the detecting device, in association with the track of the posture detected by the detecting device, the calculating unit further calculates an amount of change of the position over the predetermined period of time, from the track of the position stored in the storage unit, and the estimating unit estimates the intensity of the pressing operation of the user, from the calculated amount of change of the posture and the calculated amount of change of the position.

6. An input control method performed by an input device that includes a storage unit and a detecting device, a track of a posture, which amounts to a predetermined period of time, detected by the detecting device being stored in the storage unit, the method comprising:
    a detecting step of detecting a posture of the detecting device that is gripped by a user, and a pressing operation of the user;
    a calculating step of calculating an amount of change of the posture over the predetermined period of time, from the track of the posture stored in the storage unit;
    an estimating step of estimating an intensity of the pressing operation of the user, from the calculated amount of change if the pressing operation is detected;
    a detecting step that:
        (a) while the pressing operation of the user is being detected and if the calculated amount of change is equal to or greater than a shake predetermined threshold, determines that a shaking operation of the user is detected, sets a current shaking intensity of the shaking operation as a function of the calculated amount of change, and sets a current pressing intensity to a predetermined intensity;
        (b) while the pressing operation of the user is being detected and if the calculated amount of change is less than the shake predetermined threshold, determines that a shaking operation of the user is not detected, and determines the current pressing intensity as the intensity estimated by the estimating unit;
        (c) while the pressing operation of the user is not detected, determines whether a shaking operation of the user is detected based on the calculated amount of change and sets a current shaking intensity if the shaking operation is detected as a function of the calculated amount of change; and
    an outputting step of outputting pressing operation information that specifies the intensity of the current pressing operation when the pressing operation is detected and shaking operation information when the shaking operation has been detected, the shaking operation information including an indication of the intensity of the shaking operation as a function of the calculated amount of change.

7. A non-transitory computer-readable information recording medium that stores a program that controls a computer, including a detecting device which is gripped by a user and detects a posture of the detecting device and a pressing operation of the user, to function as:
    a storage unit that stores a track of the posture, which amounts to a predetermined period of time, detected by the detecting device;
    a calculating unit that calculates an amount of change of the posture over the predetermined period of time, from the track of the posture stored in the storage unit;
    an estimating unit that estimates an intensity of the pressing operation of the user, from the calculated amount of change if the pressing operation is detected;
    a determining unit that:
        (a) while the pressing operation of the user is being detected and if the calculated amount of change is equal to or greater than a shake predetermined threshold, determines that a shaking operation of the user is detected, sets a current shaking intensity of the shaking operation as a function of the calculated amount of change, and sets a current pressing intensity to a predetermined intensity;
        (b) while the pressing operation of the user is being detected and if the calculated amount of change is less than the shake predetermined threshold, determines that a shaking operation of the user is not detected, and determines the current pressing intensity as the intensity estimated by the estimating unit;
        (c) while the pressing operation of the user is not detected, determines whether a shaking operation of the user is detected based on the calculated amount of change and sets a current shaking intensity if the shaking operation is detected as a function of the calculated amount of change; and
    an output unit that outputs pressing operation information that specifies the current pressing intensity of the pressing operation when the pressing operation is detected and shaking operation information when the shaking operation has been detected, the shaking operation information including an indication of the current shaking intensity of the shaking operation.

8. An input device, as set forth in claim 1, wherein the output unit only outputs one of the pressing operation information and the shaking operation information at one time.

9. An input device, as set forth in claim 1, wherein the output unit may output both the pressing operation and the shaking operation at the same time.

10. An input device, as set forth in claim 1, wherein the intensity of the pressing operation includes one of weakly pressed and strongly pressed.

11. An input device, as set forth in claim 1, wherein the intensity of the pressing operation includes one of weakly pressed, rather weakly pressed, rather strongly pressed, and strongly pressed.

12. An input device, as set forth in claim 1, wherein the intensity of the shaking operation includes one of weakly shaken and strongly shaken.

* * * * *